(12) United States Patent
Sun et al.

(10) Patent No.: US 11,483,843 B2
(45) Date of Patent: Oct. 25, 2022

(54) CHANNEL STATE INFORMATION REPORTING METHOD, UE, BASE STATION AND COMPUTER READABLE STORAGE MEDIA

(71) Applicant: Samsung Electronics Co., Ltd., Suwon-si (KR)

(72) Inventors: Feifei Sun, Beijing (CN); Miao Zhou, Beijing (CN); Min Wu, Beijing (CN); Di Su, Beijing (CN); Chen Qian, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 16/766,473

(22) PCT Filed: Feb. 1, 2019

(86) PCT No.: PCT/KR2019/001425
§ 371 (c)(1),
(2) Date: May 22, 2020

(87) PCT Pub. No.: WO2019/151819
PCT Pub. Date: Aug. 8, 2019

(65) Prior Publication Data
US 2020/0383119 A1 Dec. 3, 2020

(30) Foreign Application Priority Data

Feb. 1, 2018 (CN) .......................... 201810105383.7
Apr. 4, 2018 (CN) .......................... 201810304714.X
Sep. 27, 2018 (CN) .......................... 201811136965.8

(51) Int. Cl.
*H04W 72/08* (2009.01)
*H04W 76/27* (2018.01)
(Continued)

(52) U.S. Cl.
CPC ........... *H04W 72/085* (2013.01); *G16Y 10/75* (2020.01); *H04L 5/0057* (2013.01); *H04W 24/10* (2013.01); *H04W 72/042* (2013.01); *H04W 76/27* (2018.02)

(58) Field of Classification Search
None
See application file for complete search history.

(56) References Cited

U.S. PATENT DOCUMENTS

2013/0114455 A1  5/2013  Yoo et al.
2014/0204854 A1* 7/2014  Freda .................. H04L 1/18
                                                          370/329

(Continued)

FOREIGN PATENT DOCUMENTS

IN   201841012581     *  4/2018
WO   2018/063086 A1     4/2018
WO   2019/195096 A1    10/2019

OTHER PUBLICATIONS

QUALCOMM Incorporated: "NB-IOT RLM Enhancement for Rel-14", 3GPP Draft, R4-166520_REL14_NB_IOT_RLM, 3rd Generation Partnership Project (3GPP), Mobile Competence Centre; 650, Route Des Lucioles; F-06921 Sophia-Antipolis Cedex; France No. Gothenburg, Sweden Aug. 22, 2016-Aug. 26, 2016 Aug. 21, 2016, XP051141247, Retrieved from the Internet: URL:http://www.3gpp.org/ftp/Meetings_3GPP_SYNC/RAN4/Docsl [retrieved on Aug. 21, 2016].

(Continued)

*Primary Examiner* — Gregory B Sefcheck
*Assistant Examiner* — Srinivasa R Reddivalam
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of (Continued)

Things (IoT). The present disclosure may be applied to intelligent services based on the 5G communication technology and the IoT-related technology, such as smart home, smart building, smart city, smart car, connected car, health care, digital education, smart retail, security and safety services. Embodiments of the present disclosure disclose a method for CSI reporting at a UE and the corresponding UE.

12 Claims, 14 Drawing Sheets

(51) Int. Cl.
*G16Y 10/75* (2020.01)
*H04L 5/00* (2006.01)
*H04W 24/10* (2009.01)
*H04W 72/04* (2009.01)

(56) References Cited

U.S. PATENT DOCUMENTS

| | | |
|---|---|---|
| 2015/0016312 A1 | 1/2015 | Li et al. |
| 2016/0218788 A1 | 7/2016 | Yum et al. |
| 2017/0223726 A1 | 8/2017 | Pelletier et al. |
| 2018/0006763 A1 | 1/2018 | Kim et al. |
| 2018/0014143 A1 | 1/2018 | Rico Alvarino et al. |
| 2018/0124644 A1* | 5/2018 | Rico Alvarino ...... H04W 28/16 |
| 2019/0305899 A1* | 10/2019 | Rico Alvarino ...... H04L 1/0047 |
| 2020/0037186 A1* | 1/2020 | Thangarasa ....... H04W 72/0413 |

OTHER PUBLICATIONS

Extended European Search Report dated Feb. 1, 2021, issued in European Patent Application No. 19747678.1.

* cited by examiner

CHANNEL STATE INFORMATION REPORTING METHOD, UE, BASE STATION AND COMPUTER READABLE STORAGE MEDIA

TECHNICAL FIELD

The present disclosure relates to the field of wireless communication technology, and in particular, to channel state information reporting methods, a user equipment, a base station and computer readable storage media.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology" "communication and network infrastructure" " " " " have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In order to enable a base station to obtain downlink channel quality, a User Equipment (UE) reports Channel State Information (CSI) to the base station. CSI reporting includes periodic CSI reporting and aperiodic CSI reporting. The periodic CSI reporting is performed according to a period and a time offset configured via higher layer signaling. The aperiodic CSI reporting is driven by CSI request information in Downlink Control Information (DCI) on a Physical Uplink Shared Channel (PUSCH) that is scheduled by the base station. The UE transmits an aperiodic CSI report to the base station of a serving cell according to an indication of the CSI request information. The CSI described herein may include a Channel Quality Indicator (CQI), a Precoding Matrix Indicator (PMI), a Rank Indicator (RI), and the like.

In addition, generally the channel state information also includes information representing a semi-static/long-term state of a channel, such as a Reference Signal Received Power (RSRP), a Reference Signal Received Quality (RSRQ), and a Reference Signal-Signal to Noise and Interference Ratio (RS-SINR), a Received Signal Strength Indicator (RSSI). Typically, such information is used for cell selection, cell handover, coverage level selection, and the like.

3GPP has standardized two narrowband systems for Internet of Things (IoT) in Rel13, i.e., an enhanced Machine Type Communication (eMTC) system and a Narrow Band Internet of Things (NB-IoT) system. In a coverage mode A, the eMTC system supports both periodic reporting and aperiodic CSI reporting in a connected state, while the NB-IoT system does not support any CSI reporting. In addition, the eMTC system and the NB-IoT system select coverage levels based on RSRP. However, many IoT services remain in a connected state for a short time. Therefore, in order to better allocate downlink resources for an IoT UE according to a channel state, how to report the channel state more effectively is a problem that needs to be solved, especially for uplinks of the NB-IoT system which only use Narrowband PUSCH (NPUSCH) to transmit uplink data and uplink control information.

DISCLOSURE OF INVENTION

Technical Problem

In order to better allocate downlink resources for an IoT UE according to a channel state, how to report the channel state more effectively is a problem that needs to be solved.

Solution to Problem

In a first aspect, the present disclosure provides a method for CSI reporting. The method includes: receiving configuration information for CSI reporting from a base station; triggering CSI reporting according to a CSI reporting trigger condition, wherein the CSI reporting trigger condition includes at least one of: a UE receiving the configuration information for CSI reporting, the UE receiving CSI reporting indication information, a CSI variation of currently acquired CSI relative to CSI previously reported to the base station exceeding a predefined or preconfigured condition, and the currently acquired CSI exceeding a certain threshold; and transmitting an uplink data channel carrying the CSI according to a predefined rule.

In an exemplary embodiment, the method further includes: after the configuration information for CSI reporting is received from the base station or after the CSI reporting is triggered according to the CSI reporting trigger condition, determining resources for measuring the CSI based on at least one of:

a capability of the UE to measure the CSI on measurement resources after transmitting a random access channel, a capability of the UE to measure the CSI on measurement resources on a non-anchor carrier, a capability of the UE to perform the CSI reporting on a non-anchor carrier, the configuration information configured by the base station for the CSI reporting, information indicated by the base station in a Random Access Response (RAR).

In an exemplary embodiment, the carried CSI is CSI corresponding to all or a part of frequency domain resources in resources determined by the UE for measuring the CSI.

In an exemplary embodiment, the CSI corresponding to all or the part of the frequency domain resources in the resources for measuring the CSI is CSI calculated or selected or derived by the UE by assuming transmission on all or the part of the frequency domain resources in the resources for measuring the CSI.

In an exemplary embodiment, the resource for measuring the CSI may be CSI reference resources in an existing mechanism.

In an exemplary embodiment, the resources for measuring the CSI include at least one of:

an anchor carrier, a narrowband or a Physical Resource Block 'PRB' or a carrier on which a downlink control channel for RAR is received, a narrowband or a PRB or a carrier on which a downlink data channel for RAR is received, a narrowband or a PRB or a carrier on which paging is monitored, frequency domain resources indicated in the configuration information configured by the base station for the CSI reporting, frequency domain resources indicated in the RAR by the base station, predefined resources for measuring the CSI.

In an exemplary embodiment, the CSI includes at least one of: a CQI, a PMI, an RI, an RSRP, an RSRQ, an RS-SINR, an RSSI, and an indication of a number of repetitions required to decode or detect a downlink channel.

In an exemplary embodiment, the indication of the number of repetitions required to decode or detect the downlink channel further includes: a number of repetitions satisfying decoding with a particular block error rate, or a ratio or a difference between the number of repetitions satisfying decoding with the particular block error rate and a currently configured number of repetitions.

In an exemplary embodiment, the operation of receiving the configuration information for CSI reporting from the base station further includes: receiving the configuration information for CSI reporting from the base station via a Radio Resource Control (RRC) signaling.

In an exemplary embodiment, the RRC signaling is system information.

In an exemplary embodiment, the configuration information includes at least one of:

resource information for CSI measurement, a number of repetitions of the resource for CSI measurement, a filter parameter for CSI measurement, a CSI measurement period, the CSI reporting trigger condition, a CSI indication range, resources for a random access channel indicating a capability of the UE to perform CSI reporting, and time-frequency resources for CSI reporting.

In an exemplary embodiment, the resource information for CSI measurement includes at least one of: physical time-frequency resource information for CSI measurement, reference signal information for CSI measurement, reference signal information for measuring intra-cell interference, and reference signal information for measuring inter-cell interference.

In an exemplary embodiment, after the configuration information for CSI reporting is received via the RRC signaling, the method further includes: performing CSI measurement periodically according to the configuration information.

In an exemplary embodiment, the operation of receiving the configuration information for CSI reporting from the base station further includes: for each of one or more coverage levels and/or resources for a random access channel, receiving the configuration information for CSI reporting from the base station.

In an exemplary embodiment, the CSI reporting indication information received by the UE is transmitted in a Random Access Response (RAR) or configured by system information.

In an exemplary embodiment, the uplink data channel is an uplink data channel for carrying an Msg3 message.

In an exemplary embodiment, the operation of transmitting the uplink data channel carrying the CSI according to the predefined rule further includes: transmitting the CSI in one of:

a Media Access Control (MAC) sub-header in Msg3 corresponding to a Common

Control CHannel (CCCH), a MAC Control Element (CE) or a new MAC CE, and an RRC message carried by the uplink data channel, wherein the RRC message is at least one of:

an RRC connection request message, an RRC connection resume request message, and an RRC connection re-establishment request message.

In an exemplary embodiment, said transmitting the uplink data channel carrying the CSI according to the predefined rule further includes: indicating whether Uplink Control Information (UCI) is carried on the uplink data channel by at least one of:

a pattern and/or a sequence of pilot signals of the uplink data channel, a Radio Network Temporary Identifier (RNTI) for scrambling the uplink data channel, an indication field in a MAC header or a MAC sub-header or an RRC message, wherein the pilot signal of the uplink data channel includes a Demodulation Reference Signal (DMRS), and the UCI includes the CSI.

wherein the sequence of pilot signals of the uplink data channel further includes a cyclic shift of the sequence of pilot signals.

In an exemplary embodiment, the information for indicating whether the UCI is carried on the uplink data channel is configured by the base station through RRC signaling or is pre-defined.

In an exemplary embodiment, the CSI is mapped to the uplink data channel by means of piggyback.

In an exemplary embodiment, the operation of transmitting the uplink data channel carrying the CSI according to the predefined rule further includes:

if ACK/NACK information needs to be transmitted at the same time, firstly mapping the ACK/NACK information to a Resource Element (RE) which is closest to a Reference Signal (RS), then and replacing a part of encoded and modulated uplink data channel data information with the CSI, for sequentially mapping to REs which are not occupied by the ACK/NACK information or the RS; or otherwise, replacing the part of the encoded and modulated uplink data channel data information with the CSI, for sequentially mapping to REs which are not occupied by the ACK/NACK information or the RS.

In an exemplary embodiment, the operation of mapping the CSI on the uplink data channel according to the predefined rule further includes: mapping and/or repeating the CSI and/or the ACK/NACK information on the uplink data channel on a per transport block or per RE basis.

In a second aspect, the present disclosure provides a method for CSI reporting. The method includes: configuring a UE with configuration information for CSI reporting; transmitting an RAR to the UE in response to a random access request transmitted by the UE; and receiving an uplink data channel carrying CSI and obtaining the CSI according to a predefined rule.

In an exemplary embodiment, the RAR includes CSI reporting indication information.

In an exemplary embodiment, the CSI includes at least one of: a CQI, a PMI, an RI, an RSRP, an RSRQ, an RS-SINR, an RSSI, and an indication of a number of repetitions required to decode or detect a downlink channel.

In an exemplary embodiment, the indication of the number of repetitions required to decode or detect the downlink channel further includes: a number of repetitions satisfying decoding with a particular block error rate, or a ratio or a difference between the number of repetitions satisfying decoding with the particular block error rate and a currently configured number of repetitions.

In an exemplary embodiment, the configuration information includes at least one of: resource information for CSI measurement, a number of repetitions of the resource for CSI measurement, a filter parameter for CSI measurement, a CSI measurement period, the CSI reporting trigger condition, a CSI indication range, resources for a random access channel indicating a capability of the UE to perform CSI reporting, and time-frequency resources for CSI reporting.

In an exemplary embodiment, the operation of configuring the UE with the configuration information for CSI reporting further includes: for each of one or more coverage levels and/or resources for a random access channel, configuring the UE with the configuration information for CSI reporting.

In an exemplary embodiment, the uplink data channel is an uplink data channel for carrying an Msg3 message.

In an exemplary embodiment, the receiving the uplink data channel carrying the CSI further includes: receiving the CSI in one of:

a MAC sub-header in Msg3 corresponding to a CCCH,
a MAC CE or a new MAC CE, and
an RRC message carried by the uplink data channel, where the RRC message is at least one of:
an RRC connection request message,
an RRC connection resume request message, and
an RRC connection re-establishment request message.

In an exemplary embodiment, the CSI is mapped to the uplink data channel by means of piggyback.

In a third aspect, the present disclosure provides a UE. The UE includes:

a processor; and a memory storing computer-executable instructions that, when executed by the processor, cause the processor to perform the method according to the first aspect of the present disclosure.

In a fourth aspect, the present disclosure provides a base station. The base station includes:

a processor; and a memory storing computer-executable instructions that, when executed by the processor, cause the processor to perform the method according to the second aspect of the present disclosure.

In a fifth aspect, the present disclosure provides a computer-readable medium having stored thereon instructions that, when executed by a processor, cause the processor to perform the method according to the first aspect of the present disclosure.

In a sixth aspect, the present disclosure provides a computer-readable medium having stored thereon instructions that, when executed by a processor, cause the processor to perform the method according to the second aspect of the present disclosure.

Advantageous Effects of Invention

According to various embodiments of the disclosure, reporting of channel state information can be efficiently enhanced and allocation of downlink resources for an IoT UE can be developed.

MODE FOR THE INVENTION

Figure 1:
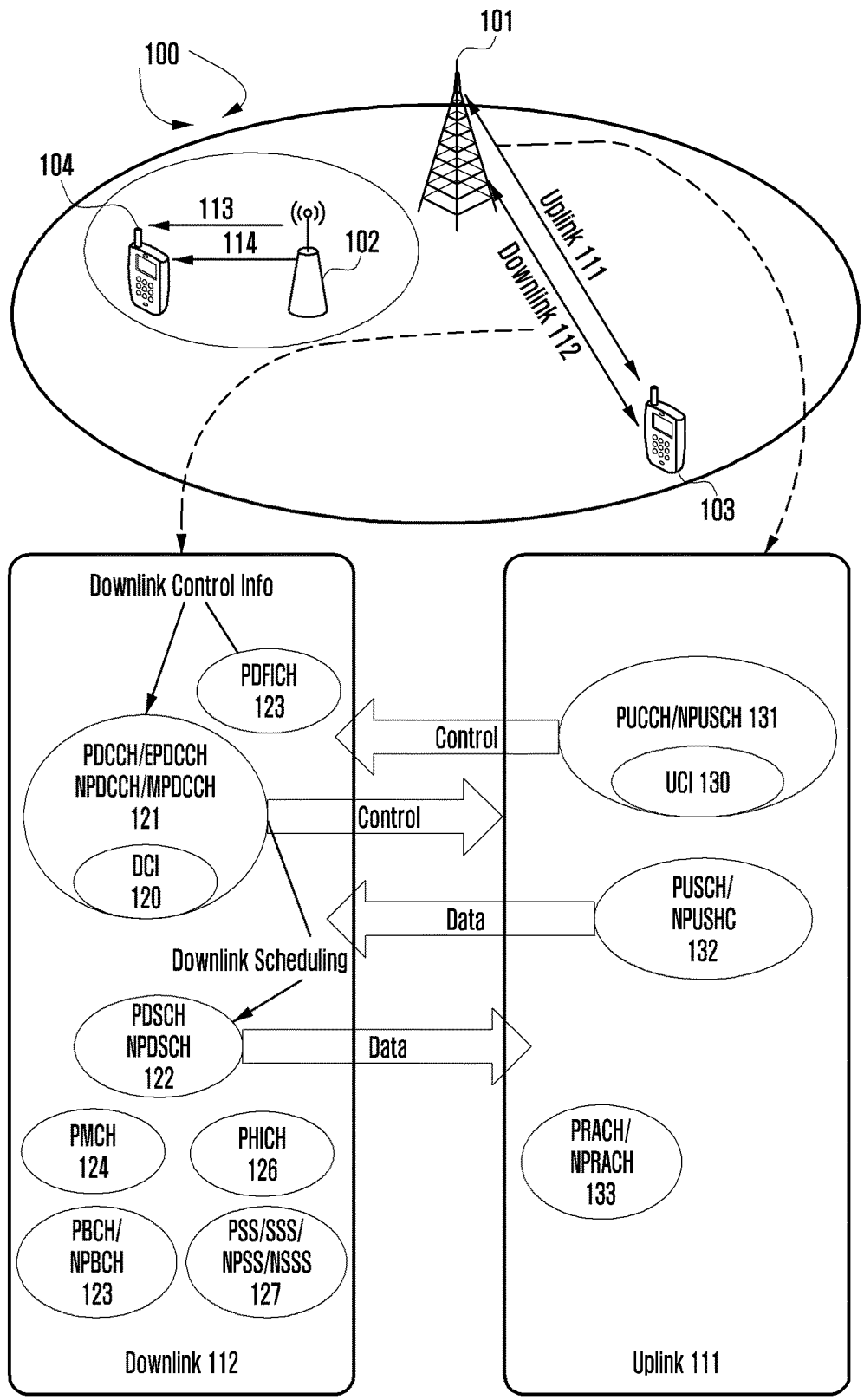
FIG. 1 schematically shows an exemplary wireless communication system to which the exemplary embodiments of the present disclosure may be applied.

Embodiments of the present disclosure are described in detail below, examples of which are illustrated in the accompanying drawings, in which the same or similar reference numbers denote the same or similar elements or elements having the same or similar functions throughout. The embodiments described below with reference to the drawings are exemplary for explaining the present disclosure only, and should not be construed as limiting the present disclosure.

It will be understood by the skilled in the art that singular forms "a", "an", "said" and "the" used herein may also include plural forms, unless specifically stated. It should be further understood that the word "comprising" used in the description of the present disclosure refers to presence of features, integers, steps, operations, elements, and/or components, but does not exclude presence or addition of one or more other features, Integers, steps, operations, elements, components, and/or combinations thereof. It should be understood that when an element is referred to as being "connected" or "coupled" to another element, it can be directly connected or coupled to the other element, or there may also be intermediate elements. In addition, "connected" or "coupled" as used herein may include wirelessly connected or wirelessly coupled. As used herein, the phrase "and/or" includes all or any of one or more of associated listed items, and all of combinations thereof.

It may be understood by the skilled in the art that, unless defined otherwise, all terms (including technical and scientific terms) used herein have the same meaning as commonly understood by the skilled in the art to which the present disclosure belongs. It should also be understood that the terms such as those defined in a general dictionary should be understood as having a meaning that is consistent with that in the context of the prior art, and will not be explained with an idealized or too formal meaning, unless specifically defined herein.

The skilled in the art may understand that the "UE" and "terminal" used herein include not only a wireless signal receiver device, which is a device only having a wireless signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a Personal Communication Service (PCS), which may combine voice, data processing, fax and/or data communication capabilities; a Personal Digital Assistant (PDA), which may include a Radio Frequency (RF) receiver, a pager, Internet/Intranet access, a web browser, a notepad, a calendar, and/or a Global Positioning System (GPS) receiver; a conventional laptop and/or palmtop computer or other device, which may be a conventional laptop and/or palmtop computer or other device having and/or including an RF receiver. The "terminal", "terminal device" as used herein may be portable, transportable, installed in a vehicle (of aviation, maritime, and/or land), or may be adapted and/or configured to operate locally, and/or may operate in a distributed form on the earth and/or at any other locations in space. The "UE" and "terminal" used herein may also be a communication terminal, an Internet terminal, a music/video playing terminal, such as a PDA, a Mobile Internet Device (MID), and/or a mobile phone having a music/video playback function, or a smart TV, a set-top box and other devices. In addition, "UE" and "terminal" may also be replaced with "user" and "UE".

FIG. 1 shows an exemplary wireless communication system 100 according to an exemplary embodiment of the present disclosure. In FIG. 1, a UE detects indication information. The wireless communication system 100 includes one or more fixed infrastructure base units, forming a network which is distributed over a geographic area. The base unit may also be referred to as an Access Point (AP), an Access Terminal (AT), a Base Station (BS), a Node-B, and an evolved NodeB (eNB), a next generation BS (gNB), or other terms used in the art. As shown in FIG. 1, one or more base units 101 and 102 provide services for several Mobile Stations (MSs) or UEs or terminal devices or users 103 and 104 in a service area. For example, the service area may be a cell or a cell section. In some systems, one or more BSs may be communicatively coupled to a controller forming an access network, and the controller may be communicatively coupled to one or more core networks. Examples in the present disclosure are not limited to any of particular wireless communication systems.

In a time and/or frequency domain, the base units 101 and 102 transmit downlink communication signals 112 and 113 to the UEs 103 and 104, respectively. The UEs 103 and 104 communicate with one or more base units 101 and 102 via uplink communication signals 111 and 114, respectively. In one embodiment, the mobile communication system 100 is an Orthogonal Frequency Division Multiplexing (OFDM)/Orthogonal Frequency Division Multiple Access (OFDMA) system including a plurality of base stations and a plurality of UEs. The plurality of base stations include the base station 101, the base station 102, and the plurality of UEs include the UE 103 and the UE 104. The base station 101 communicates with the UE 103 through the uplink communication signal 111 and the downlink communication signal 112. When the base station has a downlink packet to be transmitted to UEs, each UE may obtain a downlink allocation (resource), such as a set of radio resources in a Physical Downlink Shared Channel (PDSCH) or a Narrowband Downlink Shared Channel (NPDSCH). When the UE needs to transmit a packet to the base station in the uplink, the UE obtains an authorization from the base station, where the authorization allocates Physical Uplink Shared Channel (PUSCH) or Narrowband Uplink Shared Channel (NPUSCH) containing a set of uplink radio resources. The UE obtains downlink or uplink scheduling information from a Physical Downlink Control Channel (PDCCH), or MPDCCH, or EPDCCH or NPDCCH dedicated to itself. Hereinafter, PDSCH, PDCCH, PUSCH are used to replace the above channels. The downlink or uplink scheduling information and other control information carried on the downlink control channel are referred to as Downlink Control Information (DCI). FIG. 1 also shows different physical channels, such as downlink 112 and uplink 111. The downlink 112 includes a PDCCH or EPDCCH or NPDCCH or MPDCCH 121, a PDSCH or NPDSCH 122, a Physical Control Formation Indicator Channel (PCFICH) 123, a Physical Multicast Channel (PMCH) 124, a Physical Broadcast Channel (PBCH) or a Narrowband Physical Broadcast Channel (NPBCH) 125, a Physical Hybrid Automatic Repeat Request Indicator Channel (PHICH) 126, and a Primary Synchronization Signal (PSS), a Secondary Synchronization Signal (SSS), or a Narrowband Primary Synchronization Signal/Secondary Synchronization Signal (NPSS/NSSS) 127. The downlink control channel 121 transmits a downlink control signal to the user. The DCI 120 is carried on the downlink control channel 121. The PDSCH 122 transmits data information to the UE. The PCFICH 123 transmits information for decoding PDCCH, e.g. dynamically indicating the number of symbols used by the PDCCH 121. PMCH 124 carries broadcast multicast information. The PBCH or NPBCH 125 carries a Master Information Block (MIB) for UE early discovery and cell-wide coverage. The PHICH carries Hybrid Automatic Repeat reQuest (HARQ) information that indicates whether the base station has correctly received the uplink transmission signal. The uplink 111 includes a Physical Uplink Control Channel (PUCCH) 131 which carries Uplink Control Information (UCI) 130, a PUSCH 132 which carries uplink data information, and a Physical Random Access Channel (PRACH) 133 that carries random access information. In the NB-IoT system, no NPUCCH is defined, and NPUSCH Format 2 is used for transmitting the UCI 130.

In one embodiment, the wireless communication network 100 uses an OFDMA or multi-carrier architecture, including Adaptive Modulation and Coding (AMC) on downlink and a next-generation single-carrier FDMA architecture or multi-carrier OFDMA architecture for uplink transmission. The FDMA-based single-carrier architecture includes Discrete Fourier Transform-Spread Orthogonal Frequency Division Multiplexing (DFT-SOFDM) of Interleaved Frequency Division Multiple Access (IFDMA), Localized FDMA (LFDMA), IFDMA, or LFDMA, and also includes various enhanced Non-Orthogonal Multiple Access (NOMA) architectures of an OFDMA system, e.g., Pattern Division Multiple Access (PDMA), Sparse Code Multiple Access (SCMA), Multi-User Shared Access (MUSA), Low Code Rate Spreading Frequency Domain Spreading (LCRS FDS), Non-Orthogonal Coded Multiple Access (NCMA), Resource Spreading Multiple Access (RSMA), InterleaveGrid Multiple Access (IGMA), Low Density Spreading With Signature Vector Extension (LDS-SVE), Low code rate and Signature based Shared Access (LSSA), Non-Orthogonal Coded Access (NOCA), Interleave Division Multiple Access (IDMA), Repetition Division Multiple Access (RDMA), Group Orthogonal Coded Access (GOCA), Welch-bound equality based Spread MA (WSMA), etc.

In the OFDMA system, a remote unit is served by allocating downlink or uplink radio resources that typically include a set of subcarriers on one or more OFDM symbols. Exemplary OFDMA protocols include LTE evolved from 3GPP UMTS standards and IEEE 802.16 standards. The architecture may also include the use of transmission technologies, such as Multi-Carrier CDMA (MC-CDMA), Multi-Carrier Direct Sequence CDMA (MC-DS-CDMA), and Orthogonal Frequency and Code Division Multiplexing (OFCDM) in one-dimensional or two-dimensional transmission, or may be based on a simpler time and/or frequency division multiplexing/multiple access technology, or a combination of these different technologies. In an alternative embodiment, the communication system may use other cellular communication system protocols, including but not limited to TDMA or direct sequence CDMA.

In the NB-IoT system and the eMTC system, the UE performs downlink measurement of RSRP and compares the downlink measurement result with a threshold value broadcasted by the base station in a System Information Block (SIB), selects a coverage level of the corresponding NPRACH/PRACH, and performs a random access process. For the eMTC system, a coverage enhancement format A (small-area coverage enhancement), an eMTC UE (also referred to as a Bandwidth reduction and Low cost (BL)/ Coverage Enhancement (CE) UE) supports CQI reporting. The base station configures a number $R^{CSI}$ of repetitions for the UE by an RRC parameter csi-NumRepetitionCE to extend a range of SINR. When a code rate and spectral efficiency are calculated, it is multiplied by the base station configuration and then is compared with the code rate/ spectral efficiency in a CQI table. For wideband CSI reporting, the UE determines by calculation that time domain resources used by CSI are ceil($R^{CSI}/N_{NB,hop}^{ch,DL}$) subframes before the reference subframe, i.e., BL/CE downlink or special subframes for MPDCCH sensing on each narrow band (wherein, the BL/CE downlink or special subframes are predefined according to a protocol or configured according to RRC of the base station), where $N_{NB,hop}^{ch,DL}$ is a number of the narrow bands for sensing the MPDCCH by the BL/CE UE. For sub-band CSI reporting, the UE measures and deduces a value of CSI and reports it to the base station according to $R^{CSI}$ BL/CE downlink or special subframes for sensing the MPDCCH before the reference subframe on the corresponding sub-band. In addition, the eMTC only supports periodic or aperiodic RRC reporting according to the RRC configuration of the base station after it is in the connected state. Also, the eMTC supports reporting of other information, such as RSRP and RSRQ, which may represent the CQI, for handover. However, in a non-connected state, the CSI reporting cannot be performed.

In the current NB-IOT system, when the UE performs an initial access, it may select corresponding NPRACH resource configuration according to comparison between the measured downlink RSRP value and RSRP-ThresholdsN-PRACH-InfoList. Here, the numbers of NPRACH repetitions under different NPRACH resource configurations will be different. RSRP-ThresholdsNPRACH-InfoList is a parameter broadcasted in the SIB and includes two RSRP thresholds, that is, it can be divided into three levels according to the downlink RSRP value, respectively corresponding to up to three NPRACH resource configurations. Considering that a downlink coupling path loss and an uplink coupling path loss are close to each other, the downlink CE level determined according to the downlink RSRP value may also be used in the uplink to determine the number of NPRACH repetitions.

After receiving the NPRACH, the eNB will determine the number of the Msg2/Msg4 NPDCCH repetitions according to the corresponding downlink RSRP value. However in a practical system, decoding performance of the NPDCCH is determined by a downlink SINR, and the number of NPDCCH repetitions determined according to the downlink RSRP value may not match the actual SINR. In addition, there are only three levels for the downlink RSRP value derived by the eNB according to the received Msg1, which is thus of a greater probability of not matching the actual SINR. For example, the number of Msg2/Msg4 NPDCCH repetitions may be insufficient, which may result in successful reception of Msg1 but unsuccessful reception of Msg2/ Msg4, and eventually the NPRACH process is not successful; or the number of Msg2/Msg4 NPDCCH repetitions may be excessive, which may result in waste of resources. If the UE may report a value for representing a downlink interference quantity, such as RS-SINR, in Msg3, the eNB may select a more accurate number of repetitions for Msg4 NPDCCH, improving a success probability of the NPRACH process and optimizing system resources. In addition, the eNB may configure, for the UE, a maximum number of repetitions Rmax required for a search space specific to the UE in Msg4.

Hereinafter, a flowchart of a method for CSI reporting at a UE according to an exemplary embodiment of the present disclosure will be described in detail with reference to FIG. 2.

Figure 2:
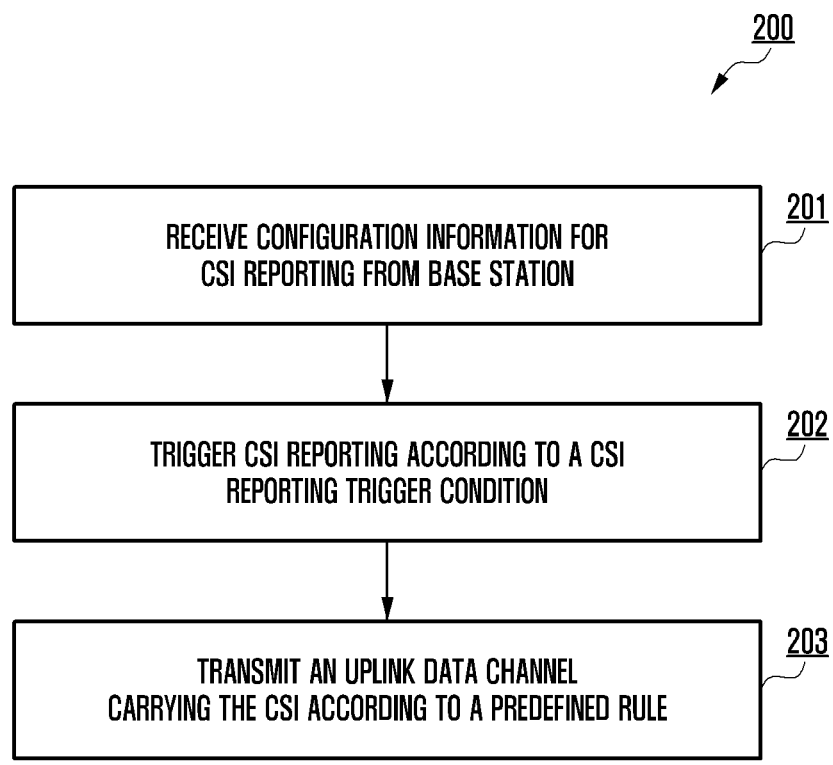
FIG. 2 schematically shows a flowchart of a method for CSI reporting at a UE according to an exemplary embodiment of the present disclosure.

FIG. 2 schematically shows a flowchart of a method 200 for CSI reporting at a UE according to an exemplary embodiment of the present disclosure. As shown in FIG. 2, the method 200 may include:

step 201, in which the UE may receive configuration information for CSI reporting from a base station;

step 202, in which the UE may trigger CSI reporting according to a CSI reporting trigger condition; and step 203, in which the UE transmits an uplink data channel carrying the CSI according to a predefined rule.

For an IoT system or other communication systems, such as NB-IoT, eMTC, etc., the CSI may include at least one of: a CQI, a PMI, an RI, an RSRP, an RSRQ, an RS-SINR, an RSSI, and an indication of a number of repetitions required to decode or detect a downlink channel.

The CSI may further include CSI reflecting the transmission on the N narrowbands/PRBs/carriers (N is a positive integer greater than or equal to 1), the CSI being calculated or selected or derived by the UE according to assuming transmission on the N narrowbands/PRBs/carriers in the CSI reference resources. Specifically, the CSI may further include a wideband CQI and/or a subband CQI in the existing mechanism.

In an exemplary embodiment, the CSI content or parameter reported by the UE is predefined, and/or is configured by the base station through the RRC signaling. Specifically, the UE receives the configuration information for the CSI reporting that is configured by the base station through RRC, and if the content or the parameter of the CSI reporting in the configuration information (which may be the configuration information corresponding to the coverage enhancement mode of the UE) is obtained, the UE reports the CSI content or parameter configured by the base station; otherwise, the UE reports the predefined CSI content or parameter (which may be the predefined CSI content or parameter corresponding to the coverage enhancement mode of the UE, for example, the predefined CSI corresponding to the coverage enhancement mode A can be the CQI, and the predefined CSI corresponding to the coverage enhancement mode B can be the indication of the number of repetitions required to decode or detect the downlink channel).

In an exemplary embodiment, the downlink may be PDCCH or PDSCH or PBCH. Accordingly, the indication of the number of repetitions required to decode or detect the PDCCH or PDSCH or PBCH may further include: a number of repetitions satisfying decoding with a particular block error rate (BLER), or a ratio or a difference between the number of repetitions satisfying decoding with the particular BLER and a currently configured number of repetitions.

In step 201, the UE may receive the configuration information for CSI reporting from the base station via RRC signaling. In an exemplary embodiment, the RRC signaling may be system information, i.e., the UE may obtain the configuration information for CSI reporting by the system information.

The configuration information may include at least one of: resource information for CSI measurement (e.g., information on CSI reference resources), a number of repetitions of the resource for CSI measurement, a filter parameter for CSI measurement, a CSI measurement period, the CSI reporting trigger condition, a CSI indication range, resources for a random access channel indicating a capability of the UE to perform CSI reporting, and time-frequency resources for CSI reporting.

The resource information for CSI measurement includes: physical time-frequency resource information for CSI measurement (e.g., time domain and frequency domain positions of a PRB or a PRB group), or reference signal information for CSI measurement (e.g., NRS, CSI-RS, CRS, DMRS, etc.), or physical channels for CSI measurement (e.g., PDCCH, PDCCH, PBCH, etc.).

In an exemplary embodiment, the physical time-frequency resource information for CSI measurement includes physical time-frequency resource location information of pilot resources used for CSI measurement (e.g., carrier position and/or subframe position for measuring the NRS). The number of repetitions of resources for CSI measurement may be indicated in the system information, and/or may be information on a maximum number of repetitions (Rmax) in the configuration information of the search space (Type 2 Common Search Space, Type-2 CSS) for the random access response. Further, the number of repetitions of resources for CSI measurement may be a minimum of a predefined number of repetitions and the number of repetitions for CSI measurement indicated by the base station: The Number of Repetitions of Resources for CSI Measurement $R^{CSI}$=min (Predefined Number of Repetitions, Configured Number of Repetitions (e.g., Rmax or Ws' configured in the SIB). Alternatively, the number of repetitions of resources for CSI measurement may be selected by the UE autonomously from the predefined number of repetitions and the number of repetitions for CSI measurements indicated by the base station.

The configuration information further includes indication of the CSI content or parameter to be reported. The content or parameter of the reported CSI may be indicated in a CSI indication range. For example, 1 bit is used for indicating that the UE reports the CQI or an indication of the number of repetitions required to decode or detect the downlink channel. For example, 1 bit is used for indicating that the UE reports the subband CQI or the wideband CQI in the existing mechanism, or it is assumed that the UE reports the wideband CQI in the existing mechanism by default and 1 bit is used for indicating whether the UE additionally reports the CQI reflecting the transmission on a narrowband (and the frequency domain position of the narrowband). Further, the configuration information may be an indication of a predefined CSI reporting mode, e.g., indicating a CQI reporting mode (Mode 1-0, Mode 1-1, Mode 2-0, etc.) in the prior art.

When the configuration information does not include information of the content or parameter of the reported CSI, the UE reports the predefined CSI content or parameter.

In addition, in order to better represent the SINR, resource information for CSI measurement may further include: reference signal information for measuring intra-cell interference, reference signal information for measuring inter-cell interference.

For the periodic CSI reporting configured by RRC, the UE may perform CSI measurement periodically according to the configuration information, after the configuration information for CSI reporting is received via the RRC signaling.

For the aperiodic CSI reporting configured by the RRC, the UE may also perform CSI measurement periodically according to the configuration information, after the configuration information for CSI reporting is received via the RRC signaling.

Specifically, the UE may perform the CSI measurement periodically and/or perform the CSI measurement when a predefined condition is met, according to the physical time-frequency resource information for the CSI measurement in the configuration information for the CSI reporting, and when the aperiodic CSI reporting is being performed, the last measured CSI is reported. In an exemplary embodiment, the base station configures periodically occurring paging occasions for the UE, and the UE performs the periodic CSI measurement according to the monitoring of the paging occasion. In an exemplary embodiment, the predefined condition includes at least one of: the UE being required to perform the additional CSI measurement according to the physical frequency domain resources for the CSI measurement which are configured in the configuration information for the CSI reporting; the given parameter in the configuration information for the CSI reporting exceeding or falling below a threshold which is predefined or configured by the base station. In an exemplary embodiment, the UE needs to perform the additional CSI measurement, according to that the physical frequency domain resources for the CSI measurement which are configured in the configuration information for the CSI reporting is not the narrowband on which the RAR is received, or is not the narrowband used by the UE to monitor the downlink control channel MPDCCH, or is not the anchor carrier, and/or is not the non-anchor carrier on which the paging occasion is monitored.

For the NB-IoT system and the eMTC system, the base station may configure a plurality of coverage levels for the PRACH. For example, the NB-IoT system may be configured with up to three coverage levels, and the eMTC system may be configured with up to four coverage levels. Since channel conditions corresponding to different coverage levels are different, the base station may configure different configuration information for different coverage levels and/or different PRACH resources. Accordingly, the UE may receive, from the base station, configuration information for CSI reporting for each of one or more coverage levels and/or resources for the random access channel. Specifically, the base station may configure different CSI indication ranges (such as configuring the CSI as CQI or the number of repetitions required to decode or detect the downlink channel, or configuring values of CSI corresponding to four states indicated by 2 bits), etc.

For the eMTC system, a plurality of coverage levels configured by the base station for the PRACH may correspond to different coverage enhancement formats. In addition, the base station may also configure different coverage enhancement formats for the UE. The coverage enhancement formats include a coverage enhancement format A (a smaller range coverage enhancement) and a coverage enhancement format B (a larger range coverage enhancement). Since different channel conditions correspond to the different coverage enhancement formats, the base station may configure different configuration information for different coverage enhancement formats, and/or the UE may report different CSI according to the different coverage enhancement formats. In an exemplary embodiment, the base station may configure configuration information for reporting the CQI for the coverage enhancement format A, and configures configuration information for reporting the number of repetitions required to decode or detect the downlink channel for the coverage enhancement format B. Correspondingly, with the coverage enhancement format A, the UE receives the configuration information for reporting the CQI from the base station and performs the CQI reporting; and with the coverage enhancement format B, the UE receives the configuration information for reporting the number of repetitions required to decode or detect the downlink channel from the base station. In another exemplary embodiment, the predefined CSI reporting with the coverage enhancement formats A and B is reporting the number of repetitions required to decode or detect the downlink channel, and the base station configures to enable the reporting of the CQI for the coverage enhancement format A, and/or the configuration information for reporting the CQI. Correspondingly, with coverage enhancement format A, the UE receives the configuration information for reporting the CQI from the base station and reports the CQI; and with the coverage enhancement format B, the UE reports the number of repetitions required to decode or detect the downlink channel according to the predefined configuration information and/or the configuration information configured by the base station for the CSI reporting.

In step 202, the UE may trigger the CSI reporting according to the CSI reporting trigger condition. The CSI reporting trigger condition may include at least one of: the UE receiving the configuration information for CSI reporting, the UE receiving CSI reporting indication information, a CSI variation of currently acquired CSI compared to the previous CSI reported to the base station exceeding a predefined or configured condition, and the currently acquired CSI exceeding a certain threshold.

For the trigger condition for CSI reporting in Msg3, its reporting indication information is transmitted in the RAR. Alternatively, its reporting indication information is configured by the system information. Specifically, if the base station enables or configures a configuration parameter for CSI, it is a trigger condition of the CSI reporting.

In step 203, the uplink data channel for transmitting and carrying the CSI may be a PUSCH.

In an exemplary embodiment, the PUSCH may be a PUSCH for carrying Msg3. The above CSI reporting may be used in a contention-based random access process and/or a non-contention random access process.

In particular, the CSI reporting may be performed before establishment of the RRC connection.

Specifically, the UE may transmit the CSI by mapping to one of: an MAC sub-header in Msg3 corresponding to a CCCH, a padding field or an additional MAC sub-header of the MAC header in Msg3, a MAC CE (or a new MAC CE), and an RRC message.

The MAC CE may be at least one of the existing MAC CEs, such as a MAC CE for DPR (Data Volume and Power Headroom Report)/PHR (Power Headroom Report)/BSR (Buffer Status Report), in which the reserved bits can be used or the currently used bits can be occupied for indicating the CSI. Alternatively, a new MAC CE can be used, for example, a MAC CE for carrying the CSI can be introduced.

The MAC CE is identified by a MAC sub-header with an LCID (Logical Channel ID). The LCID is an LCID reserved in the existing mechanism (e.g., 01011-01111 or in the non-NB-IoT system, or 11101 in the NB-IoT system);

The length of the MAC CE is fixed to 0, that is, the CSI is indicated in the sub-header of the MAC CE; or the length of the MAC CE is a fixed non-zero length or a variable length determined according to the reported CSI content, and the MAC CE including one or more CSI fields sequentially indicates one or more pieces of CSI information, and/or a CSI quantity field is used to indicate the number of pieces of CSI reported in the MAC CE.

The RRC message may be at least one of: an RRC connection request message, an RRC connection resume request message, and an RRC connection re-establishment request message.

In another exemplary embodiment, the UE may map the CSI on the uplink data channel (e.g., PUSCH) by means of piggyback. That is, the CSI is reported through a physical layer, rather than being placed in the Msg3 message. Further, for transmission of PUSCH and/or CSI required to be repeated (i.e., the number of repetitions is larger than or equal to 1), Transport Blocks (TBs) carried on CSI and PUSCH are repeated for the same times, or the number of repetitions of the CSI is configured by RRC, and the CSI is piggybacked on the PUSCH for transmission.

In an exemplary embodiment, the transmitting the uplink data channel carrying the CSI according to the predefined rule further includes: if ACK/NACK information needs to be transmitted at the same time, firstly mapping the ACK/NACK information to an RE which is closest to an RS, and then replacing encoded and modulated partial uplink data channel data information with the CSI, for sequentially mapping to REs which are not occupied by the ACK/NACK information or the RS; otherwise, replacing the encoded and modulated partial uplink data channel data information with the CSI, for sequentially mapping to REs which are not occupied by the ACK/NACK information or the RS.

Further, the mapping the CSI on the uplink data channel according to the predefined rule further includes: mapping and/or repeating the CSI and/or the ACK/NACK information on the uplink data channel on a per TB or per RE basis.

Figure 3:
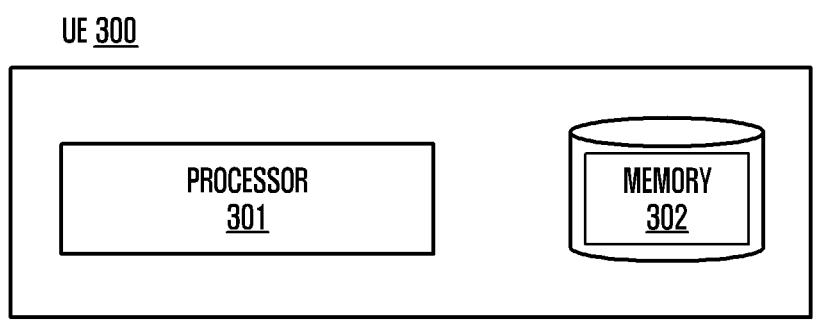
FIG. 3 schematically shows a structure diagram of a UE according to an exemplary embodiment of the present disclosure.

Hereinafter, a structure of a UE according to an exemplary embodiment of the present disclosure will be described with reference to FIG. 3. FIG. 3 schematically shows a structure block diagram of a UE 300 according to an exemplary embodiment of the present disclosure. The UE 300 may be used to perform the method 200 described with reference to FIG. 2. For the sake of brevity, only a schematic structure of the UE according to the exemplary embodiment of the present disclosure will be described herein, and the details which have been described in the method 200 with reference to FIG. 2 will thus be omitted.

As shown in FIG. 3, the UE 300 includes a processing unit or a processor 301, which may be a single unit or a combination of multiple units for performing different steps of the method; a memory 302 storing computer-executable instructions which, when executed by the processor 301, cause the processor 302 to perform operations of: receiving configuration information for CSI reporting from a base station; triggering CSI reporting according to a CSI reporting trigger condition, wherein the CSI reporting trigger condition includes at least one of: a UE receiving the configuration information for CSI reporting, the UE receiving CSI reporting indication information, a CSI variation of currently acquired CSI relative to CSI previously reported to the base station exceeding a predefined or configured condition, and the currently acquired CSI exceeding a certain threshold; and transmitting an uplink data channel carrying the CSI according to a predefined rule.

In an exemplary embodiment, the CSI includes at least one of: a CQI, a PMI, an RI, an RSRP, an RSRQ, an RS-SINR, an RSSI, and an indication of a number of repetitions required to decode or detect a downlink channel.

In an exemplary embodiment, the CSI further includes at least one of: CSI corresponding to the transmission on all of frequency domain resources in the CSI reference resources, CSI corresponding to the transmission on the selected frequency domain resources (which may be an absolute value or a difference from the reference CSI, for example, a difference between the CSI corresponding to the transmission on the selected frequency domain resources and the reference CSI when the CSI corresponding to the transmission on the CSI reference resources is the reference CSI), or the frequency domain position of the selected frequency domain resources. The CSI reference resources are frequency domain resources for the UE to perform the CSI measurement which are received from the base station through the RRC signaling, and/or the CSI reference resources defined in the existing mechanism, and/or the predefined frequency domain resources, and/or the frequency domain resources determined by the UE autonomously (for example, all of the frequency domain resources for sensing the downlink control channel PDCCH by the UE).

The selected frequency domain resources are preferred frequency domain resources selected by the UE autonomously from all the monitored frequency domain resources or all the frequency domain resources of the CSI reference resources according to the channel quality, or the frequency domain resources configured by the base station through the RRC signaling. The frequency domain position of the selected frequency domain resources is an absolute frequency domain position (e.g., an index of the narrowband/(sub)PRB/(sub)carrier), or a relative position of the selected frequency domain resources in all the CSI reference resources. For example, when all the CSI reference resources include 4 narrowbands, and the selected frequency domain resources include 1 narrowband, 2 bits are used to indicate that the relative position of the partial CSI reference resource in all the CSI reference resources is the first/second/third/fourth narrowband.

Specifically, the CSI further includes at least one of CSI calculated or selected or derived according to the conditions of: assuming transmission on all of the frequency domain resources in the CSI reference resources; the UE selecting M preferred frequency resources (e.g., M=1) from the set of all the frequency domain resources in which the control channel PDCCH is transmitted, and a reported CSI value reflecting the transmission on only one or M selected frequency domain resources, wherein the frequency domain resource in the CSI reference resources includes a narrowband or (sub)PRB or (sub)carrier.

In an exemplary embodiment, the indication of the number of repetitions required to decode or detect the downlink channel further includes: a number of repetitions satisfying decoding with a particular BLER, or a ratio or a difference between the number of repetitions satisfying decoding with the particular BLER and a current configured number of repetitions. The required number of repetitions is not obtained by measurement, but it is derived by the UE with a hypothesis via measuring the RS or a predefined physical resource. Specifically, the current base station configures a maximum number of PDCCH repetitions Rmax1 for the UE, but the UE calculates the required number of repetitions to be no larger than Rmax1/b by measuring the RS, then the UE reports a coefficient b; or, if b is greater than x, the UE reports it, where b being greater than x is used as the trigger reporting condition, x may be predefined in the protocol or configured in the CSI reporting configuration information to the UE. For another example, in MSG3, the number of repetitions required by the UE to satisfy a specific BLER is indicated by 2 bits, as shown in Table 1. The 2 bits respectively indicate four states {Rmax, Rmax/4, Rmax/2, 2Rmax}, wherein 00 is used to represent Rmax (that is, no adjustment or no reporting is required), and is also used to represent a UE that does not support this function; for the base station, if it receives 00, it is considered (temporarily) that the maximum number of PDCCH repetitions Rmax is not necessary to be adjusted, and wherein Rmax is the number of PDCCH repetitions configured in the search space for RAR/MSG3 retransmission and MSG4 transmission in the coverage level corresponding to the random access of the UE, or Rmax may be configured by the base station. For example, the base station may configure a reference number of repetitions Rmax' for each coverage level separately to construct an indication of CSI reporting. If Rmax is too small, rounding may be performed, and there will be a plurality of states representing that their numbers of repetitions are 1. Further, when Rmax=2, Rmax/4=0.5 may represent that a PDCCH Aggregation Level (AL) is only required to be 1. For example, Table 2 shows the number of repetitions that each state represents for different Rmax values. It should be noted that when Rmax>1, AL=2. Similarly, a finer channel state may be indicated by 3 bits. In this case, the UE that does not support the characteristic may be indicated separately, for example, by 000". In another example, a table may be defined that directly represents absolute values independent of Rmax or the reference number of repetitions Rmax'.

Since the base station may determine whether this function is actually supported based on UE capability in the connected state, the base station may determine, based on the UE capability, whether the status "00" actually represents that Rmax is not necessary to be adjusted (that is, the current Rmax is an Rmax required to satisfy 1% BLER), or represents that the UE has no measurement to be reported.

TABLE 1

| Number Of Repetitions Of DCI Subfame | CSI |
|---|---|
| 00 | This Function Not supported or Rmax |
| 01 | Rmax/4 |
| 10 | Rmax/2 |
| 11 | 2Rmax |

TABLE 2

| Number Of Repetitions Of DCI Subfame | CSI | | |
|---|---|---|---|
| | Rmax = 1 | Rmax = 2 | Rmax > 2 |
| 00 | This Function Not supported | This Function Not supported or AL = 2, RL = 2 | This Function Not supported or AL = 2, RL = Rmax |
| 01 | AL = 1, RL = 1 | AL = 1, RL = 1 | AL = 2, RL = Rmax/4 |
| 10 | AL = 2, RL = 1 | AL = 2, RL = 1 | AL = 2, RL = Rmax/2 |
| 11 | AL = 2, RL = 2 | AL = 2, RL = 4 | AL = 2, RL = 2Rmax |

In an exemplary embodiment, the operation of receiving the configuration information for CSI reporting from the base station further includes: receiving the configuration information for CSI reporting from the base station via RRC signaling.

In an exemplary embodiment, the RRC signaling is system information.

In an exemplary embodiment, the configuration information includes at least one of: resource information for CSI measurement, a number of repetitions of the resource for CSI measurement, a filter parameter for CSI measurement, a CSI measurement period, the CSI reporting trigger condition, a CSI indication range, resources for a random access channel indicating a capability of the UE to perform CSI reporting, and time-frequency resources for CSI reporting.

In an exemplary embodiment, after the configuration information for CSI reporting is received via the RRC signaling, the method further includes: performing CSI measurement periodically according to the configuration information.

In an exemplary embodiment, the receiving the configuration information for CSI reporting from the base station further includes: for each of one or more coverage levels and/or resources for a random access channel, receiving the configuration information for CSI reporting from the base station.

In an exemplary embodiment, the CSI reporting indication information received by the UE is transmitted in an RAR. Specifically, 1 bit in the CSI request field of the RAR is used to indicate the CSI reporting indication information. Alternatively, the CSI reporting indication information is configured by the system information. Specifically, if the base station enables (including activating by a specific signaling display) or configures the configuration parameters used for CSI (implicitly activating by optional configuration parameters used for configuring the CSI), this is a trigger condition of the CSI reporting.

In an exemplary embodiment, the CSI reporting indication information received by the UE is indicated in the RAR and the system message. Specifically, if the base station enables (including explicitly enabling by a specific signaling) or configures the configuration parameter for the CSI, and the RAR received by the UE includes the CSI reporting indication information (for example, the CSI request domain in the RAR indicates the CSI reporting), this is the trigger condition of the CSI reporting. Specifically, if the UE has the capability of performing the CSI reporting in the Msg3, and the base station enables (including explicitly enabling by a specific signaling) or configures the configuration parameter for the CSI reporting or indicates that the base station supports the characteristic of carrying the CSI reporting in the Msg3, the CSI request field in the RAR grant message received by the UE is not reserved in the contention-based random access procedure. For the UE, when the CSI request field in the RAR Grant is set to trigger a single reporting and the field is not reserved, the UE performs the aperiodic CSI reporting.

In an exemplary embodiment, the uplink data channel is an uplink data channel for carrying an Msg3 message.

In an exemplary embodiment, the transmitting the uplink data channel carrying the CSI according to the predefined rule further includes: transmitting the CSI in one of:
  a MAC sub-header in Msg3 corresponding to a CCCH,
  a MAC CE or a new MAC CE, and
  an RRC message carried by the uplink data channel, wherein the RRC message is at least one of:
  an RRC connection request message,
  an RRC connection resume request message, and
  an RRC connection re-establishment request message.

In an exemplary embodiment, the CSI is mapped to the uplink data channel by means of piggyback.

In an exemplary embodiment, the operation of transmitting the uplink data channel carrying the CSI according to the predefined rule further includes:
  if ACK/NACK information needs to be transmitted at the same time, firstly mapping the ACK/NACK information to an RE which is closest to an RS, and then replacing encoded and modulated partial uplink data channel data information with the CSI, for sequentially mapping to REs which are not occupied by the ACK/NACK information or the RS; or otherwise, replacing the encoded and modulated partial uplink data channel data information with the CSI, for sequentially mapping to REs which are not occupied by the ACK/NACK information or the RS.

Further, the operation of mapping the CSI on the uplink data channel according to the predefined rule further includes: mapping and/or repeating the CSI and/or the ACK/NACK information on the uplink data channel on a per transport block or per RE basis.

Hereinafter, a flowchart of a method for CSI reporting at a base station according to an exemplary embodiment of the present disclosure will be described in detail with reference to FIG. 4.

Figure 4:
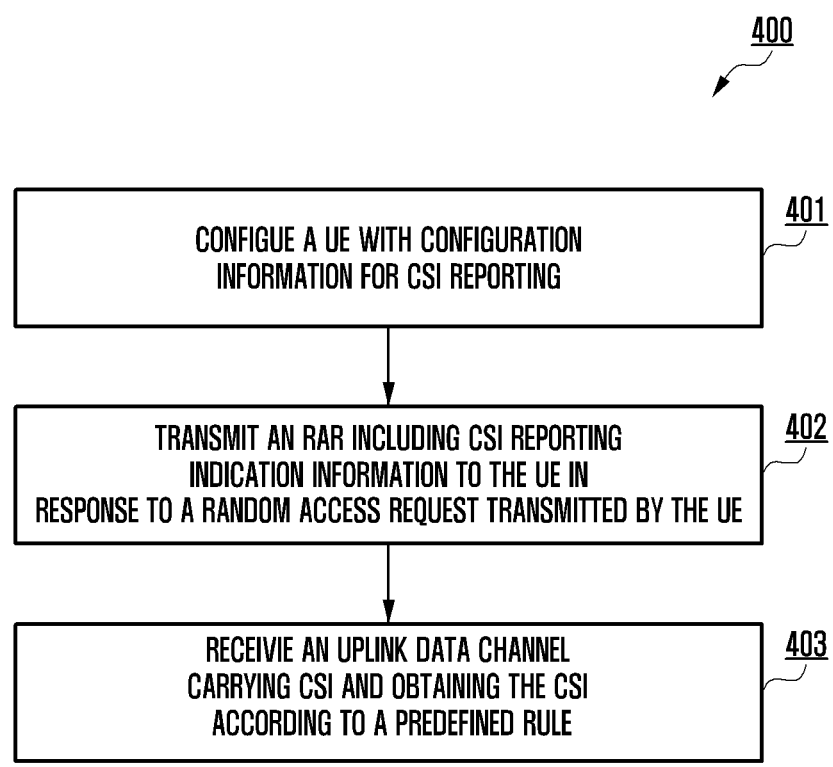
FIG. 4 schematically shows a flowchart of a method for CSI reporting at a base station according to an exemplary embodiment of the present disclosure.

FIG. 4 schematically shows a flowchart of a method 400 for CSI reporting at a UE according to an exemplary embodiment of the present disclosure. As shown in FIG. 4, the method 400 may include:

step 401, in which the base station configures a UE with configuration information for CSI reporting;

step 402, in which the base station transmits an RAR to the UE in response to a random access request transmitted by the UE; and step 403, in which the base station receives an uplink data channel carrying CSI and obtaining the CSI according to a predefined rule.

In step 402, the RAR includes CSI reporting indication information.

In an exemplary embodiment, the CSI includes at least one of: a CQI, a PMI, an RI, an RSRP, an RSRQ, an RS-SINR, an RSSI, and an indication of a number of repetitions required to decode or detect a downlink channel.

In an exemplary embodiment, the indication of the number of repetitions required to decode or detect the downlink channel further includes: a number of repetitions satisfying decoding with a particular BLER, or a ratio or a difference between the number of repetitions satisfying decoding with the particular BLER and a currently configured number of repetitions.

In an exemplary embodiment, the configuration information configured in Step 401 for the UE includes at least one of: resource information for CSI measurement, a number of repetitions of the resource for CSI measurement, a filter parameter for CSI measurement, a CSI measurement period, the CSI reporting trigger condition, a CSI indication range (including the content or parameter of the reported CSI), resources for a random access channel indicating a capability of the UE to perform CSI reporting, and time-frequency resources for CSI reporting.

In an exemplary embodiment, the operation of configuring the UE with the configuration information for CSI reporting in step 401 further includes: for each of one or more coverage levels and/or resources for a random access channel, configuring the UE with the configuration information for CSI reporting, and further includes: for each of one or more coverage enhancement modes, configuring the UE with the configuration information for CSI reporting.

In an exemplary embodiment, the uplink data channel is an uplink data channel for carrying an Msg3 message.

In an exemplary embodiment, the operation of receiving the uplink data channel carrying the CSI in step 403 further includes: receiving the CSI in one of:

a MAC sub-header in Msg3 corresponding to a CCCH,
a padding field or an additional MAC sub-header of the MAC header in Msg3, a MAC CE or a new MAC CE, and an RRC message carried by the uplink data channel, where the RRC message is at least one of: an RRC connection request message, an RRC connection resume request message, and an RRC connection re-establishment request message.

In an exemplary embodiment, the CSI is mapped to the uplink data channel by means of piggyback.

In an exemplary embodiment, it is indicated whether Uplink Control Information (UCI) is carried on the uplink data channel by at least one of: a pattern and/or a sequence of pilot signals of the uplink data channel, an RNTI for scrambling the uplink data channel, an indication field in a MAC header or a MAC sub-header or an RRC message (e.g., a CSI indication field of 1 bit). The pilot signal of the uplink data channel includes a DMRS, and the UCI includes the CSI. Further, the configuration information configured for the UE in step 401 includes the at least one of information for indicating whether the UCI is carried on the uplink data channel.

Figure 5:
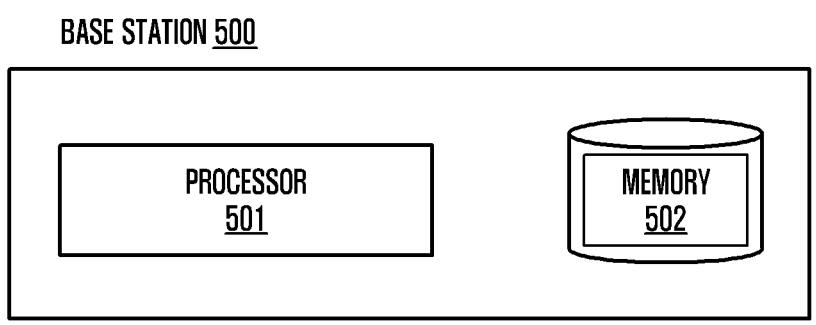
FIG. 5 schematically shows a structure diagram of a base station according to an exemplary embodiment of the present disclosure.

Hereinafter, a structure of a base station according to an exemplary embodiment of the present disclosure will be described with reference to FIG. 5. FIG. 5 schematically shows a structure block diagram of a base station 500 according to an exemplary embodiment of the present disclosure. The base station 500 may be used to perform the method 400 described with reference to FIG. 4. For the sake of brevity, only a schematic structure of the base station according to the exemplary embodiment of the present disclosure will be described herein, and the details which have been described in the method 400 with reference to FIG. 4 will thus be omitted.

As shown in FIG. 5, the base station 500 includes a processing unit or a processor 501, which may be a single unit or a combination of multiple units for performing different steps of the method; a memory 502 storing computer-executable instructions which, when executed by the processor 501, cause the processor 502 to perform operations of: configuring a UE with configuration information for CSI reporting; transmitting an RAR to the UE in response to a random access request transmitted by the UE; and receiving an uplink data channel carrying CSI and obtaining the CSI according to a predefined rule.

In an exemplary embodiment, the CSI includes at least one of: a CQI, a PMI, an RI, an RSRP, an RSRQ, an RS-SINR, an RSSI, and an indication of a number of repetitions required to decode or detect a downlink channel.

In an exemplary embodiment, the indication of the number of repetitions required to decode or detect the downlink channel further includes: a number of repetitions satisfying decoding with a particular BLER, or a ratio or a difference between the number of repetitions satisfying decoding with the particular BLER and a currently configured number of repetitions.

In an exemplary embodiment, the configuration information includes at least one of: resource information for CSI measurement, a number of repetitions of the resource for CSI measurement, a filter parameter for CSI measurement, a CSI measurement period, the CSI reporting trigger condition, a CSI indication range, resources for a random access channel indicating a capability of the UE to perform CSI reporting, and time-frequency resources for CSI reporting.

In an exemplary embodiment, the operation of configuring the UE with the configuration information for CSI reporting further includes: for each of one or more coverage levels and/or resources for a random access channel, configuring the UE with the configuration information for CSI reporting.

In an exemplary embodiment, the uplink data channel is an uplink data channel for carrying an Msg3 message.

In an exemplary embodiment, the receiving the uplink data channel carrying the CSI further includes: receiving the CSI in one of:

a MAC sub-header in Msg3 corresponding to a CCCH, a MAC CE or a new MAC CE, and an RRC message carried by the uplink data channel, where the RRC message is at least one of: an RRC connection request message, an RRC connection resume request message, and an RRC connection re-establishment request message.

In an exemplary embodiment, the CSI is mapped to the uplink data channel by means of piggyback.

Figure 6:
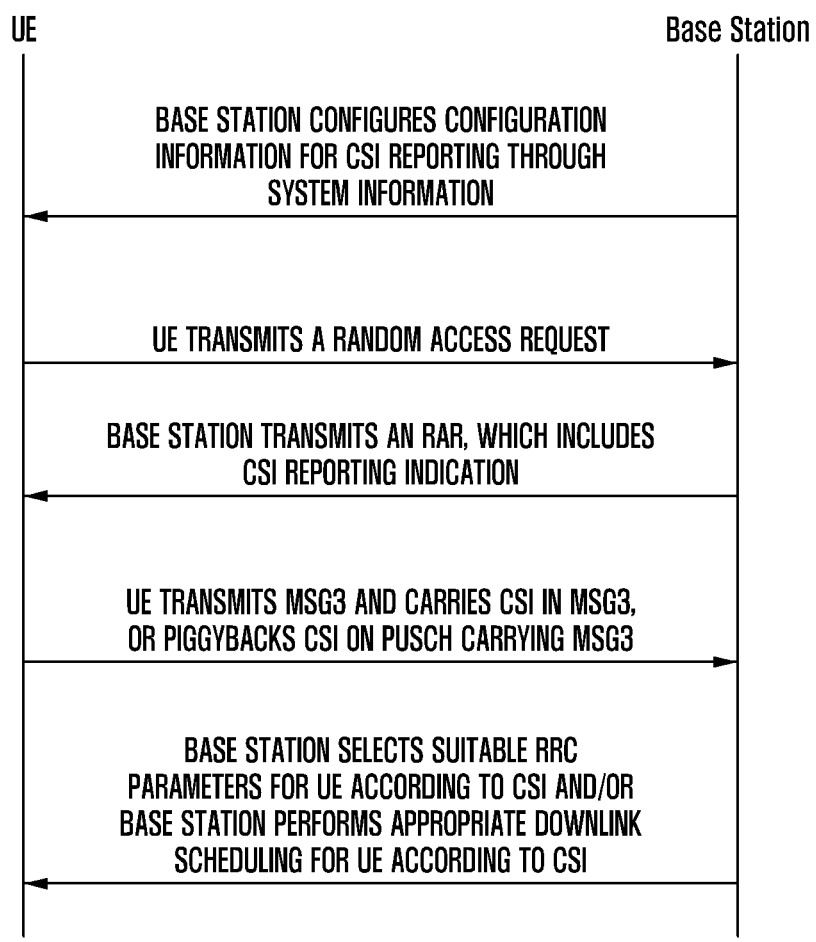
FIG. 6 schematically shows a signaling sequence for CSI reporting between a base station and a UE according to an exemplary embodiment of the present disclosure.

FIG. 6 schematically shows a signaling sequence for CSI reporting between a base station and a UE according to an exemplary embodiment of the present disclosure. As shown in FIG. 6, the UE receives configuration information for CSI reporting which is configured by the base station by means of system information; the UE transmits a random access request to the base station; the UE receives an RAR, including channel status indication information (i.e., CSI reporting indication information); the UE transmits a Msg (Message) 3 and carries CSI in the Msg3, or piggybacks the CSI on a PUSCH carrying the Msg3. In another embodiment, for some purposes (for example, one or more of following requests: an RRC connection request message, an RRC connection resume request message, an RRC connection re-establishment request message; the UE being out of synchronization in the connected state; a random access process being triggered by the base station; a random access process for handover) or all purposes, or for only contention-based or non-contention-based random access, it is not necessary to indicate the CSI reporting indication information by the RAR; and if the base station configures the configuration information for CSI reporting in the system information (that is, implicitly indicating the CSI reporting information), the CSI reporting is performed by default.

Correspondingly, the base station configures the configuration information for CSI reporting to the UE by the system information; the base station receives a random access request transmitted by the UE; the base station transmits an RAR including a CSI reporting indication; the base station receives the Msg3 transmitted by the UE and receives CSI which is in Msg3 or is piggybacked on the PUSCH carrying the Msg3; the base station selects suitable a RRC parameter for the UE according to the CSI and/or the base station performs suitable downlink scheduling for the UE according to the CSI.

The CSI includes at least one of: a CQI, a PMI, an RI, an RSRP, an RSRQ, an RS-SINR and an RSSI, or other information which may represent the channel state, e.g., an indication of a number of repetitions required to decode following channel at a specific BLER (such as 1% or 10%): PDCCH, PDSCH (PDSCH based on a configured or given bit rate or spectral efficiency), PBCH, wherein the specific BLER may be configured by the base station to the UE, or predefined in the protocol; or a number of repetitions of the current configuration being greater or less than the required number of repetitions or a certain multiple (e.g. ½ or 2 or x times) of the required number of repetitions, in which case, the CSI may be indicated by less bit information, such as 1 to 3 bits, wherein the certain multiple may be configured by the base station to the UE or predefined in the protocol (as shown in Table 1 or Table 2). In addition, in this case, the information may be deduced from a long-term statistical channel state (e.g., RS-SINR), but is not deduced from a specific subframe (set) (e.g., CQI). The long-term statistical channel state may be calculated according to L3-filter. Alternatively, the base station configures a larger number of repetitions $R^{CSI}$, so as to obtain a relatively stable indication value that may represent the CSI.

Further, the base station may configure parameters for CSI reporting respectively for different PRACH/NPRACH coverage levels. Specifically, for example, the number of repetitions $R^{CSI}$ for CQI calculation may be configured as different values for different coverage levels. For another example, the filter parameter, a parameter range of RSRQ/RSRP/RS-SINR/RSSI etc., or a type, etc., may also be respectively configured for different coverage levels. Specific parameters for on-CSI reporting may refer to parameters configured for different CSI in TS 316.331 or TS 38.331.

In an example, the RSRQ/RSRP/RS-SINR/RSSI value reported in Msg3 is the result of L3-filter. The UE may perform the L3-filter processing on the SINR measurement result according to the following formula, where $M_n$ is the latest result measured by the physical layer, $F_{n-1}$ is the result of the last L3-filter processing, and $F_n$ is the result of the latest L3-filter processing.

$$F_n=(1-a)*F_{n-1}\pm a*M_n$$

A forgetting factor of the above L3-filter is a=½ (k/4), and k is an L3-filter coefficient (FilterCoefficient). In an example, FilterCoefficient is fixed at 4, that is, a=½; in another example, FilterCoefficient is configured by the SIB as follows. If there is no indication, a default value 4, i.e., a=½, is used.

FilterCoefficient::=ENUMERATED {fc0, fc1, fc2, fc3, fc4, fc5, fc6, fc7, fc8, fc9, fc11, fc13, fc15, fc17, fc19, spare1, . . . }

For the parameter range of RSRQ/RSRP/RS-SINR/RSSI etc., the existing range may be reused, or different SINR ranges may be configured for different coverage levels, so as to reduce signaling and reporting overhead. Specifically, for example, here rssinr-Result reuses the existing RS-SINR-Range-r13, that is, 7 bits are used to indicate the quantized values of 128 values.

RS-SINR-Range-r13::=INTEGER(0 . . . 127)

In another example, rs-sinr-Result is indicated with fewer bits, e.g. SINR is quantized to 8 levels, indicated with 3 bits, thereby saving the signaling overhead.

Some previous versions of legacy UEs cannot have this CSI reporting capability. The base station may configure a separate PRACH resource for the UE having this CSI reporting capability. For the UE supporting this CSI reporting capability, it may be determined by reading the system information configured by the base station whether the base station/cell enables a CSI reporting function. For example, it may be determined by reading information of PRACH configuration whether there is a parameter of CSI reporting in the information of PRACH configuration, or whether there is a PRACH resource that is used separately to indicate the channel status reporting capability, or whether the configuration information for CSI reporting is configured etc. If the cell enables the CSI reporting function, the UE selects the corresponding PRACH resource to perform the random access request. The UE receives the RAR, and parses the content of the RAR according to a new format, such as whether there is a CSI reporting indication. For previous versions of the eMTC system or the LTE system, if it is a contention-based random access request, the CSI reporting indication information will be ignored in parsing the content of the RAR. However in the scheme of the present disclosure, CSI may be reported for any contention-based random access process, regardless of the RRC connected or the non-connected state. Therefore, if the UE determines that the base station/cell supports the new CSI reporting capability, the eMTC or LTE UE parses the CSI reporting indication information in the RAR. In another example, the UE does not need to additionally parse whether there is CSI report indication information in the RAR. As long as the base station enables this function, the CSI reporting is performed in the MSG 3 according to a predefined rule. For the NB-IoT system, reserved bit(s) in the RAR may be set as the CSI reporting indication, and only the UE supporting this function will make the parsing. In another example, whether the CSI reporting is needed to be performed may be indicated by different RNTIs for indicating RAR scheduling. Alternatively, whether all or a part of UEs corresponding to the RAR in this MAC PDU may be indicated (e.g., by bitmap) by reserved information in the MAC (sub) header in the RAR, or by a newly designed MAC CE. This new MAC CE may be placed at the end of this MAC PDU so as not to affect the legacy UE.

In an embodiment, all NB-IoT UEs must support reporting SINR or other CSI information in Msg3, that is, reporting SINR or other CSI information in advance in Msg3 is a mandatory feature for the UE. In another embodiment, reporting SINR in advance in Msg3 is an optional feature for the UE, and only the UE supporting this function reports the SINR measurement result or other CSI information in Msg3. This capability indication may also be indicated in Msg3, such as the first 7 reserved bits in the RRCConnectionRequest-NB message being all 0, indicating that the UE does not support this function. If none of these 7 reserved bits is 0, this indicates that the UE supports the function, and these 7 bits represent the reported SINR information or other information. The reporting may also be performed by reserved bits less than 7 bits.

In one embodiment, all NB-IoT eNBs must support the function of reporting CSI in Msg3. That is, reporting CSI in advance in Msg3 is a mandatory feature for the eNB. In another embodiment, reporting SINR in advance in Msg3 is an optional feature for the eNB, and only the UEs served by the eNB that supports the function can report the CSI measurement result in Msg3. The capability indication of the eNB supporting this function may be broadcasted in the SIB. In order to reduce the signaling overhead, the eNB supporting this function may be implicitly represented by configuring the configuration information for CSI reporting.

In an example, the UE may report the CSI in the Msg3 message. Specifically, the CSI reporting may be performed on the reserved bits in the existing Msg3 message, for example, a MAC sub-header in Msg3 corresponding to CCCH, or a Data Volume and Power Headroom Report (DPR) MAC CE (or a new MAC CE), or on spare bit(s) of an RRC message in an RRC connection request message (RRCconnectionrequest)/RRC connection resume request message (ConnectionResumeRequest)/RRC connection reestablishment request message (RRCconnectionReestablishmentRequest). It may be configured in the RRC with a fixed number of bits, such as 1-2 bits, or the number of bits, or different numbers of bits may be used according to different types of messages. For being configured in the RRC, spare bits (redundant bits) in the existing RRCConnectionRequest information are used to report the quantized SINR value, for example, using 7 spare bits.

The existing R13 RRCConnectionRequest-NB message consists of:

---

RRCConnectionRequest-NB-r13-IEs ::= SEQUENCE {
ue-Identity-r13 InitialUE-Identity,
establishmentCause-r13 EstablishmentCause-NB-r13, multiToneSupport-r13
ENUMERATED {true}
OPTIONAL,
multiCarrierSupport-r13 ENUMERATED {true} OPTIONAL,
spare BIT STRING (SIZE (22))
}
The new R13 RRCConnectionRequest-NB message consists of:
RRCConnectionRequest-NB-r13-IEs ::= SEQUENCE {
ue-Identity-r13 InitialUE-Identity,
establishmentCause-r13 EstablishmentCause-NB-r13,
multiToneSupport-r13 ENUMERATED {true} OPTIONAL,
multiCarrierSupport-r13 ENUMERATED {true} OPTIONAL,
rs-sinr-Result-t14,       RS-SINR-Range-r14,
spare BIT STRING (SIZE (15))
}

---

Figure 7:
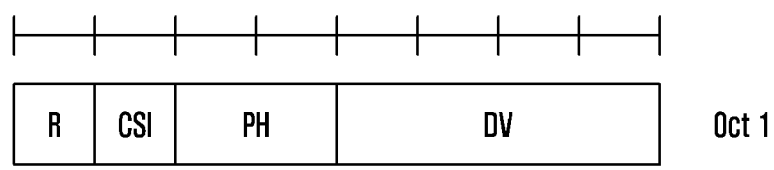
FIG. 7 schematically shows a diagram of CSI reporting in MAC CEs.

In the current NB-IOT system, the UE reports the data volume and the power headroom in the Msg3. The reporting approach is to place a DPR MAC CE fixedly before the Msg3 CCCH SDU. The DPR MAC CE has 8 bits, including 2 reserved bits, 2 PH bits, and 4 DV bits. FIG. 7 schematically shows a diagram of CSI reporting in MAC CEs. As shown in FIG. 7, based on the existing DPR MAC CE, the second reserved bit is occupied by the CSI. When the information is 1 (or 0), it indicates that the current number of PDCCH repetitions may be adjusted to ½ (or one level lower); otherwise, it indicates that the current number of PDCCH repetitions is appropriate. For example, "appropriate" may indicate that a specific BLER requirement (e.g., 1%) may be just met, and decreasing to an adjacent lower level will not meet the specific BLER requirement. In this example, the state in which the current number of PDCCH repetitions cannot satisfy the specific BLER requirement is discarded. For situations that cannot meet the requirement, the UE may select the next coverage level for random access. That is, when the UE selects the PRACH resources for random access, the UE needs to select based on whether the number of PDCCH repetitions configured for the coverage level can meet the specific BLER requirement, in addition to selecting based on the RSRP threshold configured by the base station. With reference to a CQI calculation method, the BLER of the PDCCH may be obtained by deducing from the RS of the latest Rmax or Rmax/M downlink or special subframes; or with reference to an RS-SINR calculation method, the decoding performance of the PDCCH may be deduced from the RS-SINR obtained by the base station configuring the filter coefficient, where Rmax is the maximum number of PDCCH repetitions, and M is a coefficient, which may be predefined or configured to the UE via RRC.

In addition, 2 bits may be occupied, and only four predefined CSI states may be reported.

Similarly, 1-2 bits on MAC CEs of the current Power Headroom Report (PHR) or Buffer Status Report (BSR) may be occupied for the CSI reporting.

In addition, in the existing NB-IoT system, the 2-bit Power Headroom (PH) field in the Msg3 supports only four levels of PH values (as shown in Table 3). It is too insufficient for the eNB to estimate a real UE PH. Thus, subsequent NPUSCH resource scheduling will be affected. That is because the NB-IOT UE uses open-loop power control for uplink data transmission, and the remaining PH of the UE directly affects the amount of uplink physical resources that may be scheduled subsequently. If a bit indication is added to the PH value reported in the Msg3, more efficient uplink resource scheduling may be achieved.

Figure 8:
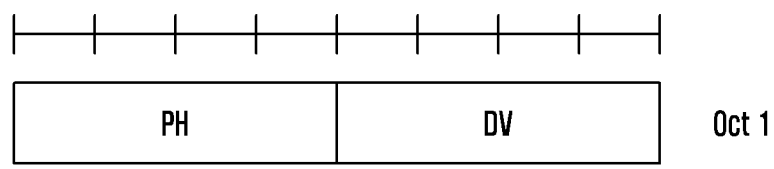
FIG. 8 schematically shows another diagram of CSI reporting in MAC CEs.

In an embodiment, in order to maintain backward compatibility of the system, the UE uses 2 reserved bits in the existing DPR MAC CE and 2 PH bits together to indicate the reported PH value. The corresponding DPR MAC CE compositions are shown in FIG. 8. Here, 4 bits are used to indicate 16 PH values, as shown in Table 4.

TABLE 3

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |

TABLE 4

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| 14 | POWER_HEADROOM_14 |
| 15 | POWER_HEADROOM_15 |

In another example, if a Transport Block Size (TBS) allocated for the Msg3 is large enough, the CSI may be reported in the PUSCH carrying the Msg3 as data or MAC CE. With reference to a process of BSR reporting, a priority may be predefined for the CSI reporting, for example, before or after the BSR and/or PHR. The method of using MAC for CSI reporting as described above is also applicable to instants other than the Msg3, which may be indicated by the DCI, or configured by the RRC (such as configured periodically), or indicated by the MAC CE (or MAC (sub) header). Alternatively, it may be triggered by a predefined event. For example, when there is a certain deviation between the CSI information and the previously reported CSI information, or the decoding of the current PDCCH or the PDSCH configured by some base station or the predefined PDSCH (for example, a code rate or spectral efficiency) cannot satisfy a specific BLER, or the configured number of repetitions exceeds or is less than a certain value or a certain multiple of the number of repetitions required to reach the code rate. The CSI reported in the Msg3 may be triggered by the event, e.g., the PDCCH/or PDSCH (the PDSCH based on the configured or given code rate or spectral efficiency) configured by the base station is too large or too small. In this case, the base station may reconfigure the number of PDCCH and/or PDSCH repetitions by the CSI message.

Figure 9:
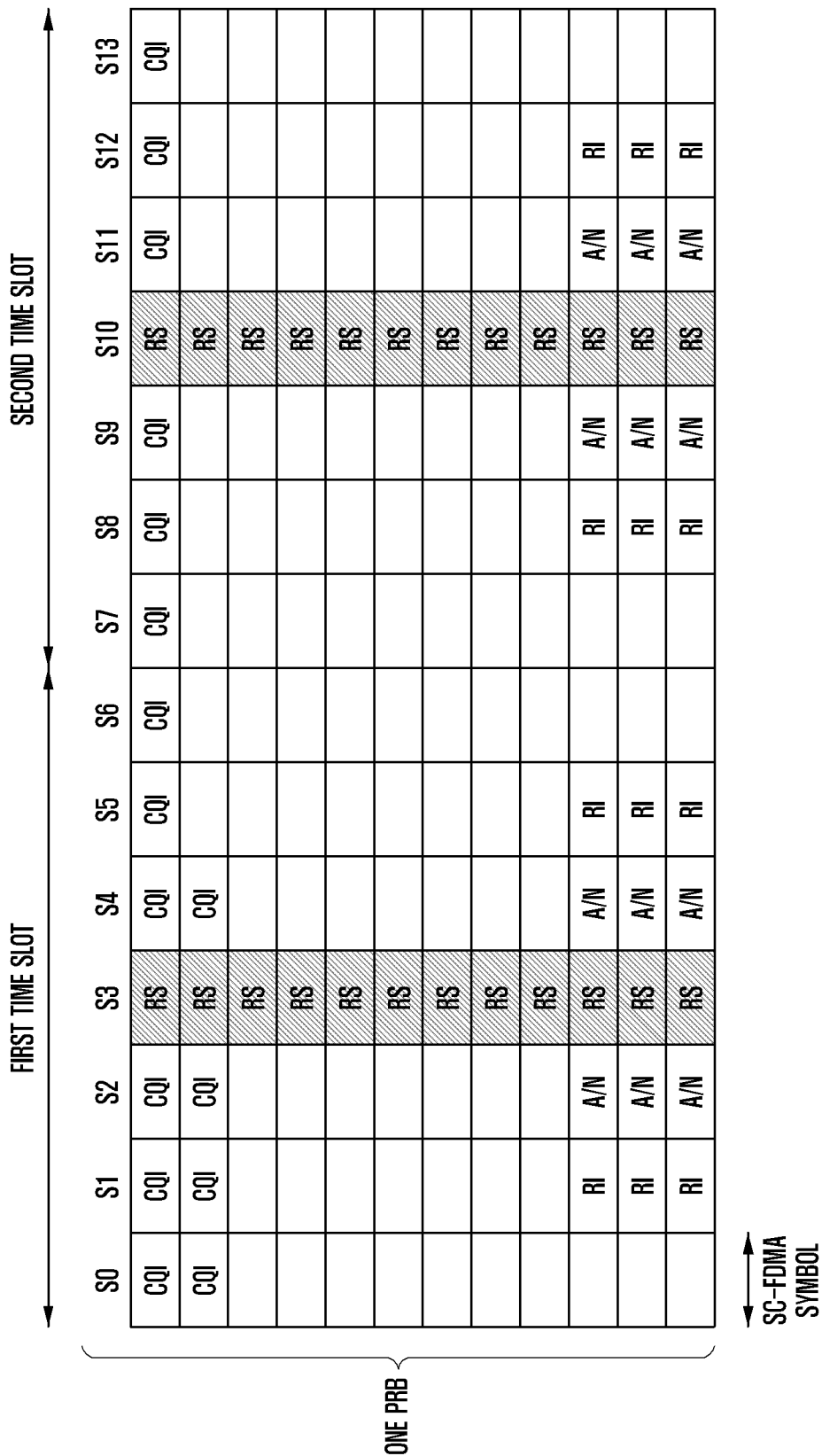
FIG. 9 schematically shows a diagram in which CSI is piggybacked on PUSCH for transmission.

In another example, the UE may piggyback the CSI as Uplink Control Information (UCI) in the PUSCH carrying the Msg3. FIG. 9 shows an example of UCI being piggybacked on the PUSCH for transmission. In order to ensure the decoding performance, HARQ ACK/NACK (A/N) feedback information is transmitted on the symbol closest to the RS, with RI being placed outside and CQI being placed before data information, occupying 16 REs, which are mapped into one PRB in an order of time domain first and frequency domain next, wherein A/N, RI, and CQI puncture the data information.

Figure 10:
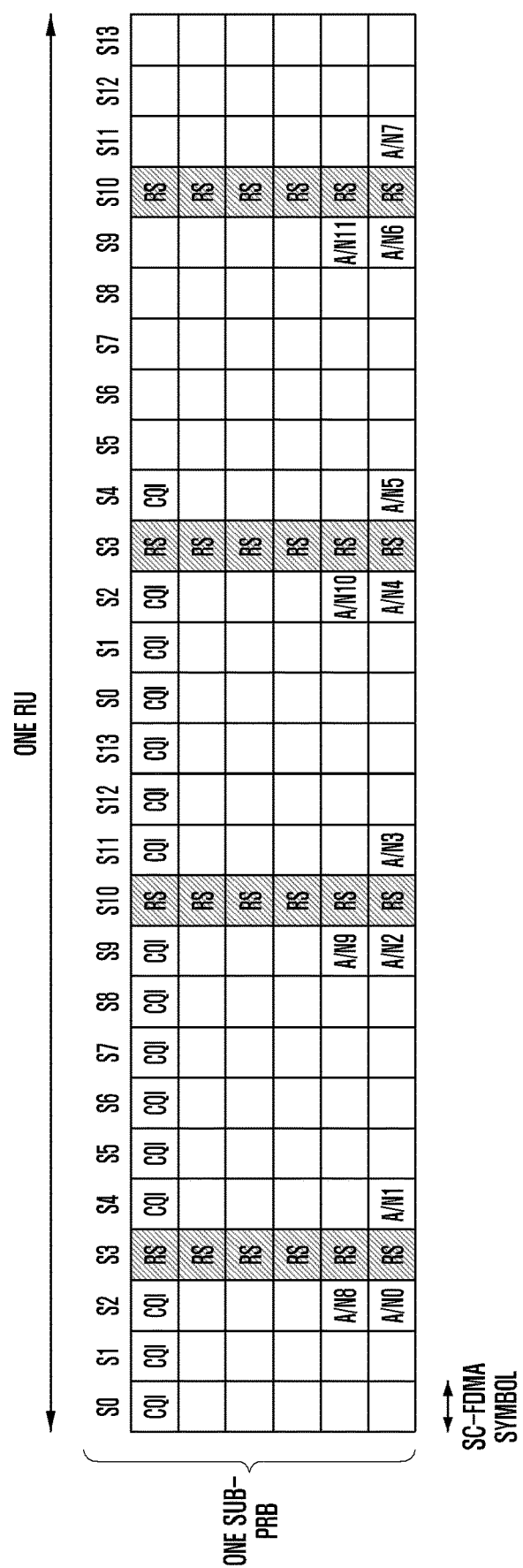
FIG. 10 schematically shows another diagram in which CSI is piggybacked on PUSCH for transmission.

FIG. 10 is an example of UCI piggybacked on PUSCH transmission during Sub-PRB scheduling. For the Sub-PRB scheduling, such as the NB-IoT system or the eMTC system after Rel-15, the PUSCH supports the Sub-PRB scheduling, which defines Resource Units (RUs) with 1, 3 and 6 subcarriers and time periods of 8 ms, 4 ms and 2 ms, respectively. FIG. 10 shows an example in which the UCI is piggybacked on the PUSCH for transmission when there are 6 subcarriers and a transmission duration of 2 ms in one RU. Although the PUSCH is crossing 2 ms and 28 symbols, since only 6 subcarriers are occupied, the code rate of the PUSCH does not change. Since the occupied bandwidth of the PUSCH becomes smaller, the energy on each subcarrier becomes larger, that is, Power Spectral Density (PSD) is boosting, which may improve the performance of the SNR at the receiving end, thereby improving the decoding performance. Therefore, in order to enable the UCI transmission to obtain the performance matching with the PUSCH, similar with the whole PRB scheduling, the same encoding may be performed for the UCI, improving the decoding performance depending on PSD boosting. The CQI in FIG. 10 is the same as that in FIG. 9, occupying 16 REs, and the A/N is also the same as that in FIG. 9, occupying 12 REs. In addition, the A/N is still transmitted on the symbol as close as possible to the RS. Meanwhile, in order to obtain a time diversity gain, the REs as discrete as possible may be selected for transmitting the A/N. As shown in FIG. 10, the A/N messages are first mapped to the REs closest to the RSs on the lowermost subcarrier (which is opposite to the subcarrier starting the data mapping), and then mapped to the REs closest to the RSs on the second subcarrier subsequently. Similarly, when the PUSCH resources are allocated to a plurality of RUs, the A/Ns maps from the lowermost subcarrier (which is opposite to the subcarrier starting the data mapping), until the next RU subsequently.

Figure 11:
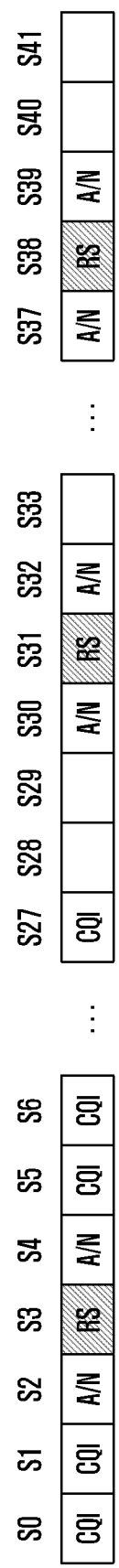
FIG. 11 schematically shows yet another diagram in which CSI is piggybacked on PUSCH for transmission.

FIG. 11 is a schematic diagram of UCI being piggybacked on PUSCH for transmission when 1 single tone resource is allocated. The rule thereof is similar with FIG. 9 and FIG. 10, i.e., mapping A/N information on the symbol (i.e., RE) closest to the RS, then mapping the CQI before PUSCH data information, and sequentially mapping to the REs not occupied by the A/N or the RS. If there is no A/N, it is sequentially mapped to REs are not occupied by the RS. Specifically, for the A/N with a length of 12 REs, symbols S2, S4, S9, S11, S16, S18, S23, S25, S30, S32, S37, and S39 are occupied. The CQI occupies 16 REs from S0 to S27 except the REs occupied by the A/N and the RS. The data part starts mapping from S28, until it fills all scheduled resource blocks (except the A/N and the RS).

The examples in FIGS. 10 and 11 only give examples of the A/N and the CQI. Feedback to the RI may be placed on the symbol outside the A/N according to the rule of FIG. 9. Alternatively, it may follow the A/N, and continue to be mapped on the REs in accordance with the A/N rule.

In addition, regardless of how many subcarriers in one RU or one PRB, when the number of PUSCH repetitions is greater than 1, the UCI is also repeated following the PUSCH per one or more RUs, so as to ensure that the UCI may obtain a repetition gain equivalent to a repetition gain of the PUSCH.

When the base station decodes the PUSCH, since the UCI punctures the PUSCH transmission, it does not affect the PUSCH coherent detection. The base station can still perform coherent demodulation of the repeated data of the two PUSCHs at the RE level to reduce the effect of noise and improve the equivalent SNR at the receiver.

For the transmission of the CSI (as the UCI) piggybacked on the PUSCH carrying the Msg3, since there are UEs that do not support such reporting (such as the legacy UEs) and UEs that support such reporting in the system, different PRACH resources may be used for distinguishing the two types of the UEs; otherwise, the base station cannot know whether the UCI is piggybacked on the PUSCH of the Msg3. Alternatively, the base station may perform blind detection on whether the UCI is piggybacked on the PUSCH. For example, the information bits in the UCI may be encoded with CRC, and then the base station may confirm whether the UCI exists by using the CRC check. However, if the number of the bits in the UCI is smaller, the overhead of adding the CRC check bits is too high. In order to reduce the overhead and reduce the blind detection complexity of the base station, the UE may indicate to the base station whether the UCI is piggybacked on the PUSCH of the Msg3 by different pilot signals (such as different pilot patterns and/or pilot sequences (including different sequences and different cyclic shifts)). The base station may decide which of the PUSCH mapping is used for decoding the Msg3 and whether the detection of the UCI is needed by detecting the different pilot signals.

In an exemplary embodiment, the transmitting of the uplink data channel carrying the CSI according to the predefined rule further includes: indicating whether UCI is carried on the uplink data channel by at least one of:

a pattern and/or a sequence of pilot signals of the uplink data channel, an RNTI for scrambling the uplink data channel, an indication field in a MAC header or a MAC sub-header or an RRC message, wherein the pilot signal of the uplink data channel includes a DMRS, and the UCI includes the CSI.

In an exemplary embodiment, the information for indicating whether the UCI is carried on the uplink data channel is configured by the base station through RRC signaling or is pre-defined. Further, the information for indicating whether the UCI is carried on the uplink data channel may be configured by the base station separately for each of one or more coverage (enhancement) levels and/or random access channel resources and/or coverage enhancement modes, or predefined. Specifically, the RRC signaling may be system information.

Further, for the transmission of the uplink data channel of the Msg3 whose number of repetitions is greater than or equal to 1, for each repetition or every Z repetitions, the at least one of the above is used to indicate whether the UCI is carried on the uplink data channel, where Z is a redundancy version cycling period.

Figure 12:
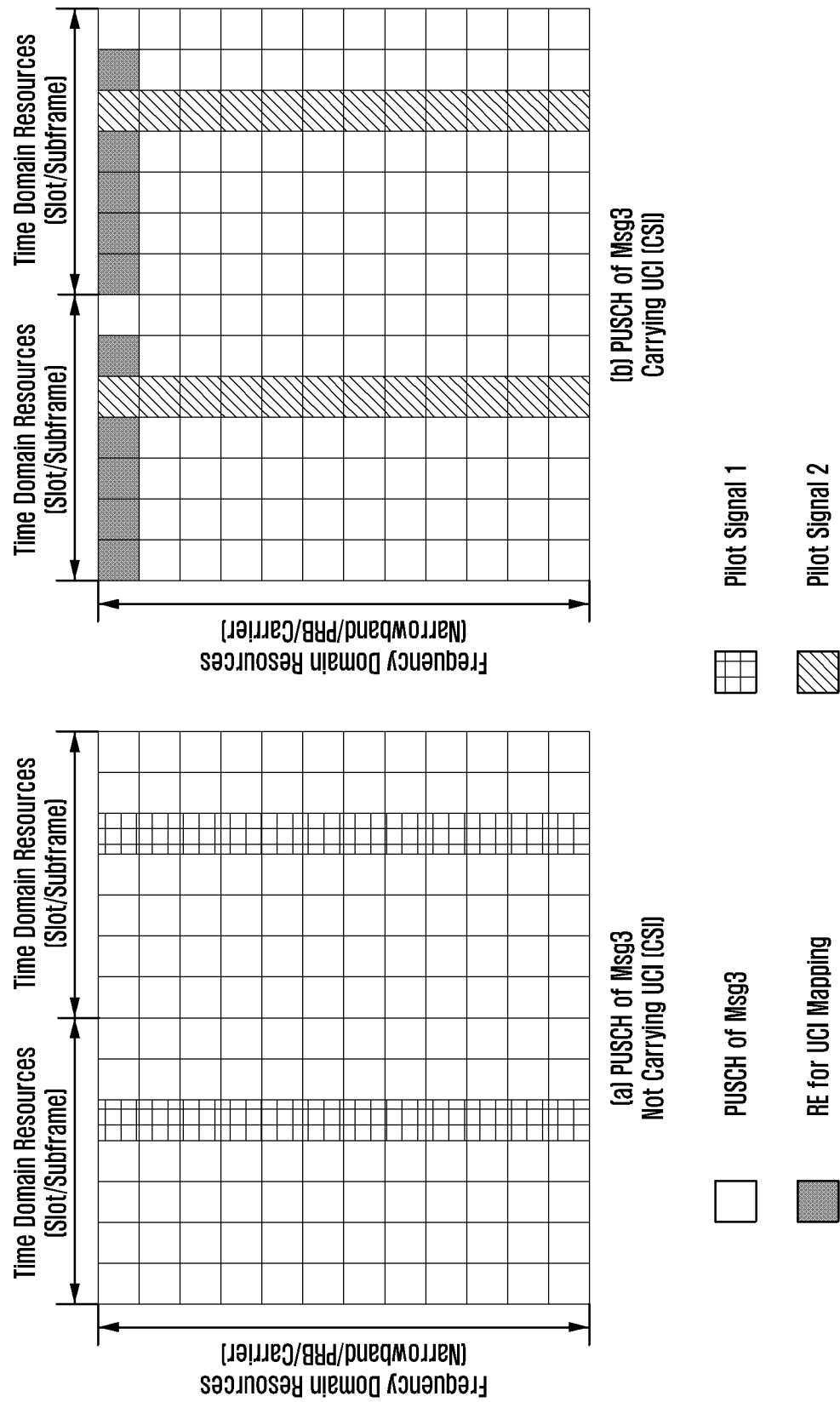
FIG. 12 schematically shows an example of indicating whether CSI is carried by an uplink data channel using a pilot signal of the uplink data channel.

FIG. 12 is an example of using a pilot signal of an uplink data channel for indicating whether CSI is carried on the uplink data channel. The pilot signal in this example may be a demodulation reference signal DMRS. The UE obtains information of the pilot signal for the CSI reporting which is indicated in the configuration information for the CSI reporting. The information of the pilot signal for the CSI reporting is used for indicating whether the UCI (including the CSI) is carried on the uplink data channel, which may be a pattern or sequence of pilot signals, or a method of generating the pattern/sequence of pilot signals, or a predefined information required for the method of generating the pattern/sequence of pilot signals (e.g., some parameter in a predefined calculation formula). When the CSI reporting is carried in the Msg3, as shown in (b) of FIG. 12, the UE generates the uplink shared channel PUSCH carrying the Msg3 according to the existing mechanism, replaces a part of the encoded and modulated data information of the uplink data channel with the CSI, sequentially maps it to REs that are not occupied by the ACK/NACK information or RS; and generates the pattern or sequence of pilot signals (e.g., Pilot Signal 2 in FIG. 12) according to the information of the pilot signal for the CSI reporting, the pattern or sequence of pilot signals being mapped to the REs at the corresponding positions as the reference signal of the uplink data channel of the Msg3; otherwise, when the CSI reporting is not carried in the Msg3, as shown in (a) of FIG. 12, the UE generates the uplink shared channel PUSCH carrying the Msg3 according to the existing mechanism, generates the reference signal of the uplink data channel of the Msg3 according to an existing mechanism (for example, Pilot Signal 1 in FIG. 12, or the examples in FIGS. 9 to 11) and maps it to the REs at the corresponding positions.

In another example, the UE acquires the RNTI configured by the base station, including the RNTI in the existing mechanism and a new RNTI for the CSI reporting. When the CSI reporting is carried in the Msg3, the uplink data channel of the Msg3 sent by the UE is scrambled by the new RNTI reported by the CSI; otherwise, when the CSI reporting is not carried in the Msg3, the uplink data channel of the Msg3 sent by the UE is scrambled by the RNTI in the existing mechanism. The UE acquires the new RNTI for the CSI reporting, including the new RNTI and/or the parameters for calculating the new RNTI indicated by the base station in the configuration information for the CSI reporting and/or the random access response RAR, and/or the RNTI determined by the UE according to the predefined criteria and/or the configuration information of the base station (including the configuration information for the CSI reporting and the information indicated in the random access response RAR), for example, the UE calculates the new RNTI for the CSI reporting according to the temporary C-RNTI (TC-RNTI) indicated in the RAR.

In another example, the UE uses a 1-bit CSI indication field in the MAC header or MAC sub-header or RRC message to indicate whether the CSI is carried on the uplink data channel.

In the existing MTC and NB-IoT systems, the UE may be scheduled by the base station to different frequency domain resources (narrowbands/PRBs/carriers) for uplink transmission and downlink reception. For this possibility, a method for reporting the CSI in the Msg3 is to enable the UE to report in the Msg3 the CSI related to the frequency domain resources used in the subsequent downlink reception, so that the CSI reported by the UE in the Msg3 is more valuable to the transmission scheduled by the base station, and better reflects the channel state of the subsequent downlink reception of the UE. For example, in an Early Data Transmission (EDT) scenario, the UE reports in the Msg3 the CSI corresponding to the frequency domain resources of the downlink control channel PDCCH and/or the downlink data channel PDSCH for receiving the random access response RAR, or the UE reports in the Msg3 the CSI corresponding to the frequency domain resources of the PDCCH of the Msg3 (e.g. for scheduling the retransmission of the Msg3) and/or the PDCCH of the Msg4. For example, for a non-EDT scenario, the UE reports in the Msg3 the CSI corresponding to the frequency domain resources of the PDCCH and/or the PDSCH for receiving the random access response RAR, or reports the CSI corresponding to the frequency domain resources monitored by the plurality of UEs, as the reference information considered by the base station to which frequency domain resources the UE is scheduled for the downlink reception.

Another method for reporting the CSI in the Msg3 is to design frequency domain resources corresponding to the reported CSI based on such a basic criterion that in order to reduce the power consumption of the UE, the reported CSI won't cause additional CSI measurements compared to the existing UE behavior. Therefore, the CSI reported by the UE is the CSI corresponding to the frequency domain resources for monitoring or downlink reception in the existing behavior (for example, the PDCCH and/or PDSCH for RAR, the narrowband/carrier/PRB on which the paging is monitored, and the frequency domain resources for measuring RSRP/RSRQ before the RACH is transmitted). Further, the UE may report one piece of CSI or multiple pieces of CSI corresponding to multiple frequency domain positions.

Hereinafter, specific descriptions of feasible technical solutions related to the two methods will be provided.

In an exemplary embodiment, in step 203 of the method 200 for the CSI reporting performed at the UE side according to the exemplary embodiment of the present invention, the CSI carried on the uplink data channel sent by the UE according to a predefined rule may be corresponding to the resources determined by the UE for measuring the CSI, and specifically, corresponding to all or a part of the frequency domain resources in the resources for measuring the CSI.

The CSI corresponding to all or the part of the frequency domain resources in the resources for measuring the CSI is CSI calculated or selected or derived by the UE according to assuming transmission on all or the part of the frequency domain resources in the resources for measuring the CSI.

The resources for measuring the CSI may be the CSI reference resources in the existing mechanism, and/or the resources for measuring the CSI are determined based on at least one of: the capability of the UE to measure the CSI on the measurement resources after transmitting the random access channel (e.g., PRACH), the capability of the UE to measure the CSI on the measurement resources of the non-anchor carrier, the capability of the UE to perform the CSI reporting on the non-anchor carrier, the configuration information configured by the base station for the CSI reporting, the information indicated by the base station in the RAR, a predefined criterion. The number of frequency domain resources for measuring the resources of the CSI may be zero, that is, the UE determines that the CSI reporting in the Msg3 is not supported.

Figure 13:
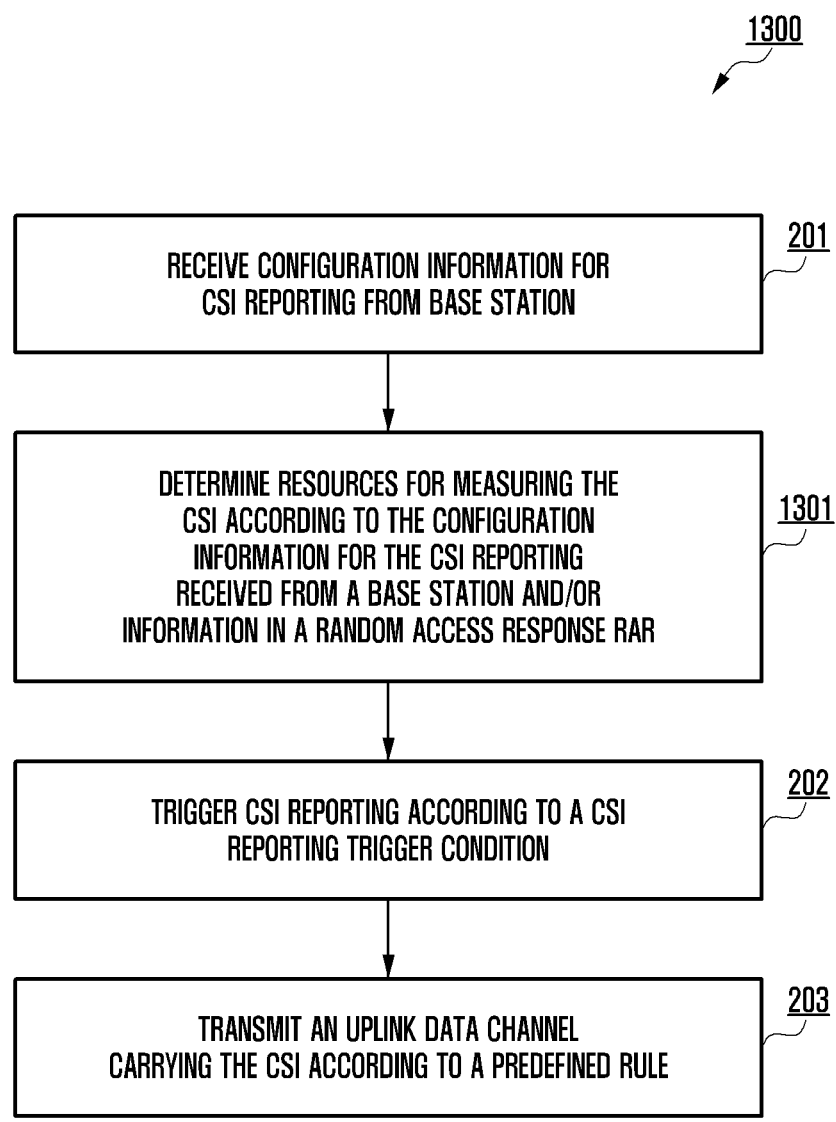
FIG. 13 schematically shows a flowchart of a method for CSI reporting at a UE according to another exemplary embodiment of the present disclosure.

In another exemplary embodiment, as shown in FIG. 13, after the UE receives the configuration information for indicating the CSI reporting from the base station in step 201, the UE may determine the resources for the CSI according to the configuration information for indicating the CSI reporting, and/or the information in the RAR received in step 1301 from the base station. Next, in step 202, the CSI reporting is triggered according to the CSI reporting trigger condition; then in step 203, the uplink data channel carrying the CSI is transmitted according to the predefined rule.

Figure 14:
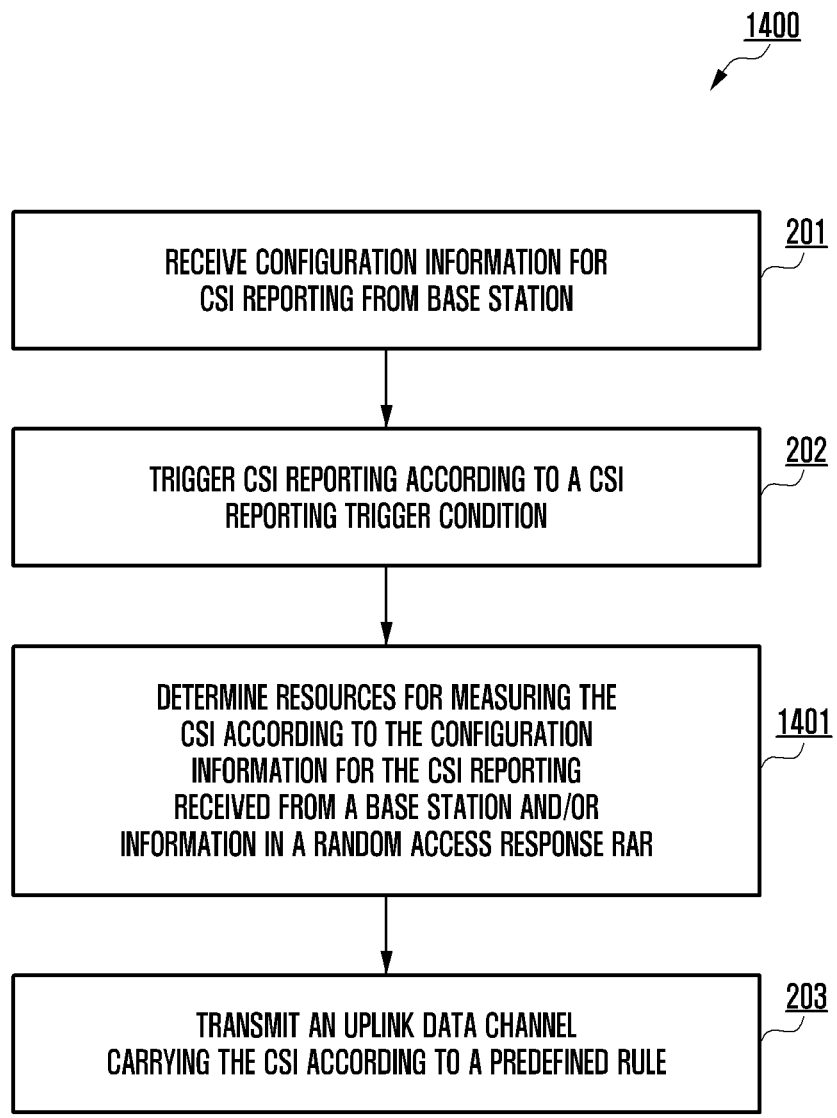
FIG. 14 schematically shows a flowchart of a method for CSI reporting at a UE according to yet another exemplary embodiment of the present disclosure.

In another exemplary embodiment, as shown in FIG. 14, the UE may receive the configuration information for indicating the CSI reporting from the base station in step 201; after triggering the CSI reporting according to the CSI reporting trigger condition in step 202, the UE may determine the resources for measuring the CSI according to the configuration information for indicating the CSI reporting and/or the information in the RAR received in step 1401 from the base station. Then in step 203, the uplink data channel carrying the CSI is transmitted according to the predefined rule.

The resources for measuring the CSI may include at least one of: an anchor carrier, a narrowband or a PRB or a carrier on which a downlink control channel for RAR is received, a narrowband or a PRB or a carrier on which a downlink data channel for RAR is received, a narrowband or a PRB or a carrier on which paging is monitored, frequency domain resources indicated in the configuration information configured by the base station for the CSI reporting, frequency domain resources indicated in the RAR by the base station, predefined resources for measuring the CSI. The PRB or carrier in any of the above items may be a sub-PRB or a sub-carrier. Further, if the frequency hopping of the channel or the frequency domain resources corresponding to the resources for measuring the CSI is enabled, the resources for measuring the CSI further include all narrowbands or (sub)PRBs or (sub)carriers for the frequency hopping.

Further, if the frequency domain resources for measuring the CSI include the non-anchor carrier, when the UE measures the CSI on the non-anchor carrier of the resources for measuring the CSI, the UE performs operations including at least one of: measuring the reference signal periodically transmitted on the non-anchor carrier, measuring the reference signal from N1 subframes before the start of a search space for monitoring the RAR (for example, a Type-2 Common Search Space (CSS)) and N2 subframes after the end of the search space, measuring the reference signal from the N3 subframes before the start of a search space for monitoring the paging and/or wakeup signal (WUS) to the N4 subframes after the end of the search space.

Further, if the resources for measuring the CSI do not include any frequency domain resource, that is, the resource for measuring the CSI is empty, the UE does not report the CSI.

Additionally, it should be noted that the UE determining the resources for measuring the CSI and the UE triggering the CSI reporting do not have an absolute order in time. In an example, the UE determines the resources for measuring the CSI according to the configuration information for indicating the CSI reporting, and then triggers the CSI reporting by the information indicated in the RAR. In another example, the UE triggers the CSI reporting by the information indicated in the RAR, and then determines the resources for measuring the CSI according to the configuration information for indicating the CSI reporting and the information indicated in the RAR.

In an exemplary embodiment, the UE determines the resources for measuring the CSI according to at least one of: the predefined criterion, the capability of the UE to measure the CSI for reporting after the RACH is transmitted, the configuration information for the CSI reporting configured by the base station, the information indicated by the base station in the RAR. If the UE has the capability of measuring the CSI for reporting after the RACH is transmitted, when the frequency domain resources of the PDCCH of the Msg3/4 are indicated in the RAR received by the UE (for example, the Msg3/4 MPDCCH narrowband index field is included in the RAR), according to the predefined criterion and/or the information indicated in the RAR, the resources for measuring the CSI include at least one of: the narrowband or PRB or carrier for the PDCCH of the Msg3/4 that indicated in the RAR, the narrowband or PRB or carrier on which the downlink control channel PDCCH for RAR is received, the narrowband or PRB or carrier on which the downlink data channel PDSCH for RAR is received, or the frequency domain resources in the configuration information configured by the base station for the CSI reporting. Otherwise, when the frequency domain resources of the PDCCH of the Msg3/4 are not indicated in the RAR received by the UE (for example, the Msg3/4 MPDCCH narrowband index field is not included in the RAR), the resources for measuring the CSI include at least one of: the narrowband or PRB or carrier on which the downlink control channel PDCCH for RAR is received, the narrowband or PRB or carrier on which the downlink data channel PDSCH for RAR is received, or the frequency domain resources in the configuration information configured by the base station for the CSI reporting.

Otherwise, if the UE does not have the capability of measuring the CSI for reporting after the RACH is transmitted, no matter whether the frequency domain resources of the PDCCH of the Msg3/4 is indicated in the RAR received by the UE, according to the predefined criterion, the resources for measuring the CSI include at least one of: the narrowband or PRB or carrier on which the downlink control channel PDCCH for RAR is received, the narrowband or PRB or carrier on which the paging is monitored, and the frequency domain resources in the configuration information configured by the base station for the CSI reporting, the anchor carrier.

In an exemplary embodiment, the UE determines the resources for measuring the CSI according to at least one of: the predefined criterion, the capability of the UE to measure the CSI for reporting after the RACH is transmitted, the capability of the UE to support the CSI reporting of the non-anchor carrier, or the configuration information for the CSI reporting configured by the base station. For the NB-IoT UE having the capability of measuring the CSI for reporting after the RACH is transmitted and supporting the non-anchor carrier, the resources for measuring the CSI include: the carrier for the CSI reporting which is configured by the base station and/or predefined. If the carrier meets at least one of the following conditions that the carrier is a carrier of the PDCCH and/or PDSCH for RAR, that the carrier is the anchored Carrier, that the carrier is the non-anchor carrier on which the paging (including the anchor/non-anchor carrier for monitoring the paging occasions of the NB-IoT UE itself and/or the paging occasions of other UEs) is monitored, the base station configures the position of the NB-IoT reference signal NRS on the carrier, the UE can assume that there are NRSs available for measurement (e.g., periodically occurring) on the carrier.

In an example, if any of the carriers configured by the base station for the CSI reporting does not meet any of the above conditions, or if the base station does not configure a carrier for the CSI reporting, the resources for measuring the CSI is the carrier of the PDCCH and/or PDSCH for RAR. In another example, if the base station configures the carrier for the CSI reporting and the carrier meets at least one of the above conditions, the resources for measuring the CSI are the carrier.

Otherwise, for a UE that does not have the capability of measuring the CSI for reporting after the RACH is transmitted and has the capability of supporting the CSI reporting of the non-anchor carrier, the resources for measuring the CSI include: the carrier for the CSI reporting which is configured by the base station and/or predefined. If the carrier meets at least one of the following conditions that the carrier is the anchor carrier, that the carrier is the non-anchor carrier on which the paging (including the anchor/non-anchor carrier for monitoring the paging occasions of the UE itself and/or the paging occasions of other UEs) is monitored, the base station configures the position of the NB-IoT reference signal NRS on the carrier, the UE can assume that there are NRSs available for measurement (e.g., periodically occurred) on the carrier.

In an example, if any of the carriers configured by the base station for the CSI reporting does not meet any of the above conditions, or if the base station does not configure a carrier for the CSI reporting, the resources for measuring the CSI is the anchor carrier and/or the non-anchor carrier on which paging is monitored. In another example, if the base station configures the carrier for the CSI reporting and the carrier meets at least one of the above conditions, the resources for measuring the CSI are the carrier.

Further, for the CSI reporting in the random access procedure on the non-anchor carrier, if the resources for measuring the CSI do not include any non-anchor carrier, according to the predefined criterion, the resource for measuring the CSI is the anchor carrier and the CSI of the anchor carrier is reported by the UE in the Msg3, or the CSI reporting is not performed by the UE in the Msg3.

Otherwise, for the UE that does not have the capability of supporting the CSI reporting of the non-anchor carrier, according to the predefined criterion, the resource for measuring the CSI is the anchor carrier and the CSI of the anchor carrier is reported by the UE in Msg3, or for random access on the anchor carrier, the existing mechanism can be reused, the CSI reporting is not performed by the UE in the Msg3 for the random access UE on the non-anchor carrier.

In an exemplary embodiment, If the UE has the capability of measuring the CSI for reporting after the RACH is transmitted, when the frequency domain resources of the PDCCH of the Msg3/4 are indicated in the RAR received by the UE (for example, the Msg3/4 MPDCCH narrowband index field is included in the RAR), the UE measures the CSI corresponding to the narrowband or PRB or carrier for the PDCCH of the Msg3/4 that indicated in the RAR, and reports the CSI in the Msg3. If the UE completes the CSI measurement before the Msg3 transmission time in the existing mechanism, the UE transmits the Msg3 according to the time in the existing mechanism; otherwise, the UE transmits the Msg3 according to a new transmission time which may be determined based on the maximum number of repetitions (for example, Rmax) in the configuration information for the CSI reporting. Specifically, when the maximum number of repetitions in the configuration information for the CSI reporting does not exceed a given threshold, the UE transmits the Msg3 according to the time in the existing mechanism, otherwise the UE transmits the Msg3 according to the new transmission time.

Correspondingly, if the base station indicates the frequency domain resources of the PDCCH of the Msg3/4 in the RAR transmitted to the UE, the base station monitors the Msg3 transmitted by the UE at the time of transmitting the Msg3 in the existing mechanism, and if it is not successfully received, the base station monitors the Msg3 transmitted by the UE at the new transmission time.

In an exemplary embodiment, when the base station supports the CSI reporting in the Msg3, the base station may schedule, in the RAR that triggers the CSI reporting, a larger TBS for the UE than that in the existing mechanism, wherein the redundant part of the TBS may be used for indicating the CSI information.

For the above examples, it should be additionally noted that whether the UE has the capability of measuring the CSI for reporting after the RACH is transmitted may be whether the UE has the capability of generating the Msg3 carrying the CSI after the RACH is transmitted. For example, if the UE has the capability of generating the Msg3 after the RACH is transmitted or has the capability of modifying the generated Msg3 to carry the CSI (including carrying the CSI as the RRC layer message field, carrying the CSI as the MAC CE or field, carrying the CSI as the physical layer information) after the RACH is transmitted, the UE may be considered to have the capability of measuring the CSI for reporting after the RACH is transmitted; otherwise the UE may be considered not to have the capability of measuring the CSI for reporting after the RACH is transmitted.

Computer-executable instructions or programs for implementing the functions of various embodiments of the present disclosure may be recorded on a computer-readable storage medium. Corresponding functions can be realized by having a computer system read programs recorded on the recording medium and execute these programs. The so-called "computer system" herein may be a computer system embedded in the device, and may include an operating system or hardware (such as a peripheral device). The "computer-readable storage medium" may be a semiconductor recording medium, an optical recording medium, a magnetic recording medium, a short-time dynamic storage program recording medium, or any other recording media readable by a computer.

Various features or functional modules of the devices used in the above embodiments may be implemented or performed by circuitry (e.g., a single-chip or multi-chip integrated circuit). Circuits designed to perform the functions described in the present specification may include general purpose processors, digital signal processors (DSPs), application specific integrated circuits (ASICs), field programmable gate arrays (FPGAs), or other programmable logic devices, discrete Gate or transistor logic, discrete hardware components, or any combination of the above. A general-purpose processor may be a microprocessor or any existing processor, controller, microcontroller, or state machine. The above circuit may be a digital circuit or an analog circuit. In a case of new integrated circuit technology that replaces existing integrated circuits due to advances in semiconductor technology, one or more embodiments of the present disclosure may also be implemented using these new integrated circuit technologies.

The skilled in the art will understand that the present disclosure includes devices that are involved in performing one or more of the operations described in the present disclosure. These devices may be specially designed and manufactured for the required purposes, or may also include known devices in general purpose computers. These devices have computer programs stored thereon that are selectively activated or reconfigured. Such computer programs may be stored in a device (e.g., a computer) readable medium or in any type of medium suitable for storing electronic instructions and coupled to a bus, including but not limited to any types of disks, including a floppy disk, a hard disk, an optical disk, a CD-ROM, and a magneto-optical disk, a ROM (Read-Only Memory), a RAM (Random Access Memory), an EPROM (EraSable Programmable Read-Only Memory), an EEPROM (Electrically Erasable Programmable Read-Only Memory), a flash memory, a magnetic card, or a light card. That is, a readable medium includes any medium that stores or transmits information in a readable form by a device (e.g., a computer).

The skilled in the art can understand that each block of these structural diagrams and/or block diagrams and/or flowcharts, and combinations of blocks in these structural diagrams and/or block diagrams and/or flowcharts may be implemented by computer program instructions. The skilled in the art can understand that these computer program instructions can be provided to a processor of a general-purpose computer, a professional computer, or a processor for other programmable data processing method, so that the schemes specified in one or more blocks of the structural diagrams and/or block diagrams and/or flowcharts may be executed by the processor of the computer or the computer for other programmable data processing method.

The skilled in the art can understand that various operations, methods, steps, measures, and schemes that have been discussed in the present disclosure can be alternated, changed, combined, or deleted. Further, various operations, methods that have been discussed in the present disclosure, and other steps, measures, and schemes in the process can also be alternated, changed, rearranged, decomposed, combined, or deleted. Further, various operations, methods, steps, measures, and schemes in the prior art and those disclosed in the present disclosure may also be alternated, changed, rearranged, decomposed, combined, or deleted.

The foregoing descriptions are merely some of the embodiments of the present disclosure. It should be noted that for the skilled in the art, a number of improvements and modifications may be made without departing from the principle of the present disclosure. These improvements and modifications should also fall within the protection scope of the present disclosure.

The invention claimed is:

1. A method performed by a terminal supporting a narrowband internet of things (NB-IoT) in a wireless communication system, the method comprising:
   receiving, from a base station, a system information block (SIB) including first information indicating a report of downlink channel quality;
   generating a result of a downlink channel quality measurement performed based on the first information included in the SIB; and
   transmitting, to the base station, a radio resource control (RRC) message which is a message 3 (MSG3) of a random access procedure, the RRC message including second information corresponding to the result,
   wherein the second information includes a plurality of bits indicating information on a minimum NB-IoT physical downlink control channel (NPDCCH) repetition level which satisfies a predetermined block error rate (BLER),
   wherein the plurality of bits being all 0 indicates that no information is reported for the downlink channel quality measurement, and
   wherein a value of the plurality of bits other than all 0 indicates the result.

2. The method of claim 1,
   wherein the SIB is associated with an NB-IoT system, and
   wherein the RRC message comprises an RRC connection request message, an RRC connection resume request message, or an RRC connection reestablishment request message.

3. The method of claim 2, wherein a number of the plurality of bits is different for different RRC messages.

4. A method performed by a base station supporting a narrowband internet of things (NB-IoT) in a wireless communication system, the method comprising:
   transmitting, to a terminal, a system information block (SIB) including first information indicating a report of downlink channel quality; and
   receiving, from the terminal, a radio resource control (RRC) message which is a message 3 (MSG3) of a random access procedure, the RRC message including second information corresponding to a result of a downlink channel quality measurement based on the first information included in the SIB,
   wherein the second information includes a plurality of bits indicating information on a minimum NB-IoT physical downlink control channel (NPDCCH) repetition level which satisfies a predetermined block error rate (BLER),
   wherein the plurality of bits being all 0 indicates that no information is reported for the downlink channel quality measurement, and
   wherein a value of the plurality of bits other than all 0 indicates the result.

5. The method of claim 4,
   wherein the SIB is associated with an NB-IoT system, and
   wherein the RRC message comprises an RRC connection request message, an RRC connection resume request message, or an RRC connection reestablishment request message.

6. The method of claim 5, wherein a number of the plurality of bits is different for different RRC messages.

7. A terminal supporting a narrowband internet of things (NB-IoT) in a wireless communication system, the terminal comprising:
   a transceiver configured to transmit or receive a signal; and
   a controller coupled with the transceiver and configured to:
      receive, from a base station, a system information block (SIB) including first information indicating a report of downlink channel quality,
      generate a result of a downlink channel quality measurement performed based on the first information included in the SIB, and
      transmit, to the base station, a radio resource control (RRC) message which is a message 3 (MSG3) of a random access procedure, the RRC message including second information corresponding to the result,
   wherein the second information includes a plurality of bits indicating information on a minimum NB-IoT physical downlink control channel (NPDCCH) repetition level which satisfies a predetermined block error rate (BLER),
   wherein the plurality of bits being all 0 indicates that no information is reported for the downlink channel quality measurement, and
   wherein a value of the plurality of bits other than all 0 indicates the result.

8. The terminal of claim 7,
   wherein the SIB is associated with an NB-IoT system, and
   wherein the RRC message comprises an RRC connection request message, an RRC connection resume request message, or an RRC connection reestablishment request message.

9. The terminal of claim 8, wherein a number of the plurality of bits is different for different RRC messages.

10. A base station supporting a narrowband internet of things (NB-IoT) in a wireless communication system, the base station comprising:
    a transceiver configured to transmit or receive a signal; and
    a controller coupled with the transceiver and configured to:
       transmit, to a terminal, a system information block (SIB) including first information indicating a report of downlink channel quality, and
       receive, from the terminal, a radio resource control (RRC) message which is a message 3 (MSG3) of a random access procedure, the RRC message including second information corresponding to a result of a downlink channel quality measurement based on the first information included in the SIB,
    wherein the second information includes a plurality of bits indicating information on a minimum NB-IoT physical downlink control channel (NPDCCH) repetition level which satisfies a predetermined block error rate (BLER),
    wherein the plurality of bits being all 0 indicates that no information is reported for the downlink channel quality measurement, and
    wherein a value of the plurality of bits other than all 0 indicates the result.

11. The base station of claim 10,
    wherein the SIB is associated with an NB-IoT system, and
    wherein the RRC message comprises an RRC connection request message, an RRC connection resume request message, or an RRC connection reestablishment request message.

12. The base station of claim 10, wherein a number of the plurality of bits is different for different RRC messages.

* * * * *